(12) United States Patent
Juncker et al.

(10) Patent No.: US 9,674,810 B2
(45) Date of Patent: Jun. 6, 2017

(54) METHOD, APPARATUS AND COMPUTER PROGRAM FOR SEARCH AND SYNCHRONISATION

(71) Applicant: Broadcom Corporation, Irvine, CA (US)

(72) Inventors: Carsten Juncker, Herlev (DK); Lars Christensen, Charlottenlund (DK)

(73) Assignee: BROADCOM CORPORATION, Irvine, CA (US)

( * ) Notice: Subject to any disclaimer, the term of this patent is extended or adjusted under 35 U.S.C. 154(b) by 299 days.

(21) Appl. No.: 14/288,740

(22) Filed: May 28, 2014

(65) Prior Publication Data
US 2014/0355596 A1    Dec. 4, 2014

(30) Foreign Application Priority Data
May 29, 2013    (GB) .................................... 1306560.9

(51) Int. Cl.
*H04J 3/06*      (2006.01)
*H04W 56/00*     (2009.01)

(52) U.S. Cl.
CPC ............... *H04W 56/0035* (2013.01)

(58) Field of Classification Search
CPC .................................................. H04W 56/00
USPC ......................................................... 370/350
See application file for complete search history.

(56) References Cited

U.S. PATENT DOCUMENTS

| | | | |
|---|---|---|---|
| 6,480,555 B1 * | 11/2002 | Renard | H04L 7/04 370/526 |
| 2005/0036568 A1 * | 2/2005 | De Ruijter | H04L 25/062 375/316 |
| 2006/0023823 A1 | 2/2006 | Sun et al. | |
| 2006/0245474 A1 * | 11/2006 | Brunel | H04B 1/707 375/146 |

* cited by examiner

*Primary Examiner* — Christopher R Crompton
(74) *Attorney, Agent, or Firm* — Oblon, McClelland, Maier & Neustadt, L.L.P.

(57) ABSTRACT

Disclosed is an apparatus, method and computer program which frequency shifts a received signal by a first frequency value and low-pass filters the frequency shifted received signal at a first cutoff frequency to filter out a plurality of adjacent carrier frequencies. Parallel baseband processing is then performed on two or more adjacent carrier frequencies among the plurality of adjacent carrier frequencies based upon an adjacent carrier power criterion. In certain examples, the parallel baseband processing is adapted for detecting a frequency correction burst in two or more adjacent Global System for Mobile Communications carrier frequencies or an Enhanced Data Rates for Global System for Mobile Communications Evolution carrier frequencies.

20 Claims, 14 Drawing Sheets

METHOD, APPARATUS AND COMPUTER PROGRAM FOR SEARCH AND SYNCHRONISATION

TECHNICAL FIELD

The present invention relates to a method, apparatus and computer program for search and synchronisation. The example and non-limiting embodiments of this invention relate generally to wireless communication systems, methods, devices and computer programs. Specific examples relate to techniques for searching and synchronising a wireless communication device with an access point in the wireless communication system.

BACKGROUND

Recently, telecommunication regulators around the globe have enacted a policy of liberalisation with respect to spectrum allocation for wireless communication systems to increase accessibility as well enhance the transmission capacity of wireless communication devices populating those systems. Rival radio access technologies in different regions of the world are now sharing frequency bands as a result of refarming spectrum previously allocated exclusively to just one radio access technology. For example, Global Systems for Mobile Communication (GSM) frequencies in some countries occupied the same frequencies now used by wide band systems such as wideband code division multiple access (WCDMA), high-speed downlink packet access (HSDPA), code division multiple access 2000 (CDMA2000), or Interim Standard 95 (IS95) as a result of refarming initiatives. In particular, in North America and Latin America GSM frequency bands PCS1900, GSM900 and GSM850 overlap with frequencies employed by Universal Terrestrial Radio Access Networks (UTRAN) such as bands 2 and 5 as a result of spectral politics. Similarly, in 2009 the European Commission directed that all European Union countries implement spectrum policies reflecting liberalisation of spectrum among revival radio access technologies, as such creating opportunities for overlap between GSM networks and wide band systems as well as UTRA networks.

More recently, telecommunication regulators around the globe are in the process of frequency refarming frequencies employed by wide band systems and UTRAN to fourth generation (4G) wireless mobile communication technologies, such as Evolved Universal Terrestrial Radio Access Networks (EUTRAN) in accordance with the Third Generation Partnership Program (3GPP) Long Term Evolution LTE/LTE-Advance (LTE-A) standards. Also, various working groups of 3GPP are investigating work items related to Release 12 and future Release 13 of the LTE-A/LTE-Beyond (LTE-B) standards. Such work items are studying technical enablers to enhance frequency re-use and densification of macro cells (e.g. increasing numbers of access points with greater frequency reuse such as femto and pico eNBs in close proximity). Accordingly, once frequencies employed by wide band systems and UTRAN are further reframed to LTE/LTE-A/LTE-B networks and cells become hyper-densified, overlapping of frequencies will become significant.

As a result of the above described overlap of frequency bands, various performance issues have developed. These performance issues are due to increases in adjacent channel interference (ACI) and co-channel interference (CCI). For example, one well documented 2G performance phenomenon is that a single 3G frequency band is typically detected as 21 to 25 separate 2G cells. As such, initial cell searching and synchronisation times for a mobile station (MS) (or user equipment (UE) with GSM capabilities) have been prolonged. A corollary to such prolonged cell searching and synchronisation is an increase in battery power consumption, which is perceived by the end users as reduced standby and talk/data times.

The following abbreviations which may be found in the specification and/or the drawing figures are defined as follows:

2G Second Generation
3G Third Generation
4G Fourth Generation
3GPP Third Generation Partnership Project
ACI adjacent channel interference
BA BCCH allocation
BCCH broadcast control channel
BSIC base station identity code
BTS base transceiver station
CDMA code division multiple access
CDMA2000 code division multiple access 2000
DL downlink
EDGE Enhanced Data Rates for GSM Evolution
EUTRAN Evolved Universal Terrestrial Radio Access Network
FB frequency correction burst
FCCH frequency correction channel
GERAN GSM/EDGE radio access network
GNSS Global Navigation Satellite System
GSM Global Systems for Mobile Communication
GMSK Gaussian minimum shift keying
HSPA high-speed downlink packet access
IS 95 interim standard 95
ISI inter-symbol interference
LTE Long Term Evolution
LTE-A Long Term Evolution Advanced
MS mobile station
QAM quadrature amplitude modulation
RF radio frequency
RSSI received signal strength indicator
SCH synchronisation channel
TDMA time division multiple access
TS transmission slot
UE user equipment
UL uplink
UTRAN Universal Terrestrial Radio Access Network
WCDMA wideband code division multiple access

DETAILED DESCRIPTION

Figure 1:
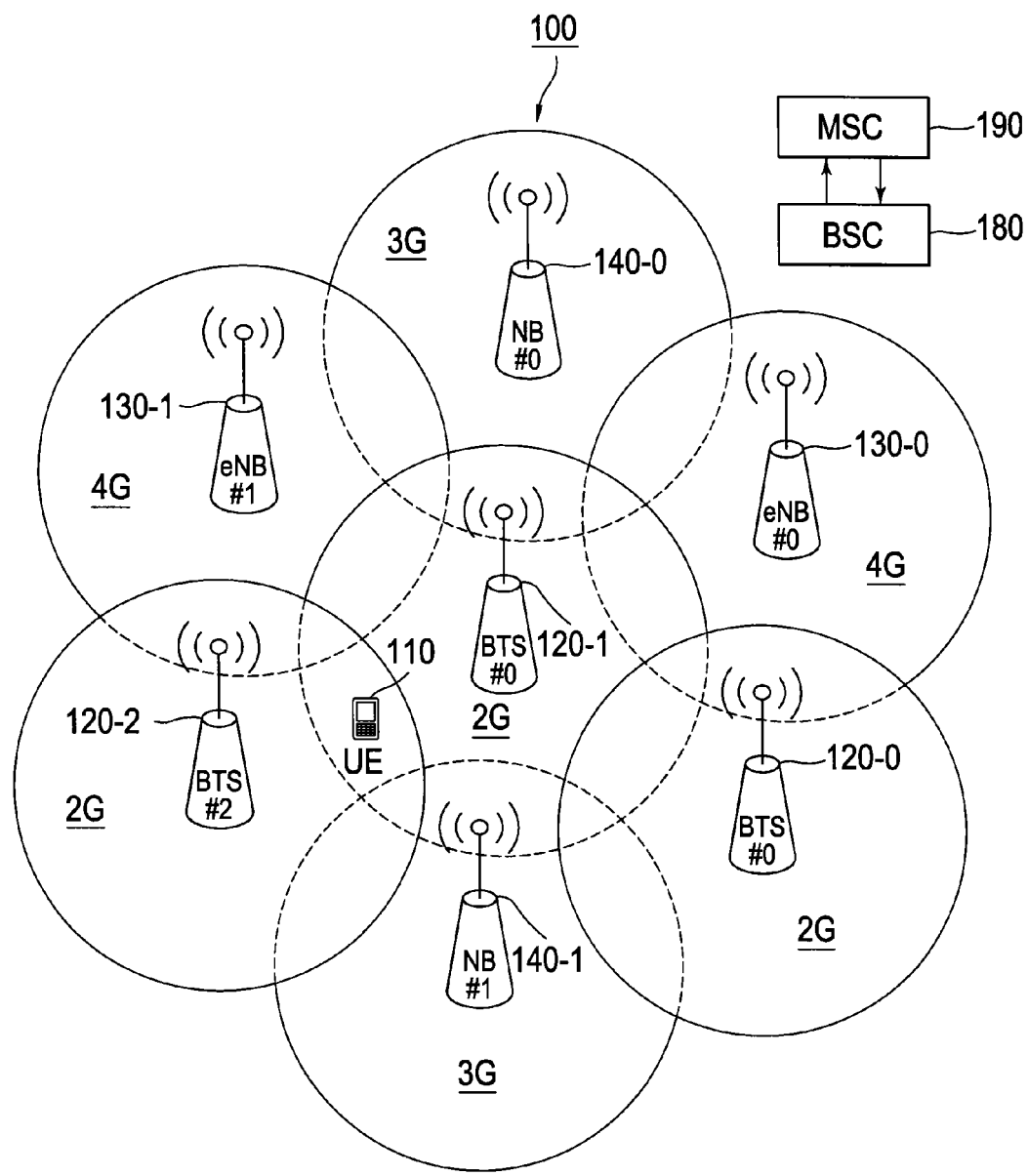
FIG. 1 illustrates an example of a wireless communication system suitable for carrying out some example embodiments of the present invention.

According to a first aspect of the present invention, there is provided a method comprising: frequency shifting a received signal by a first frequency value and low-pass filtering the frequency shifted received signal at a first cutoff frequency to filter out a plurality of adjacent carrier frequencies; and performing parallel baseband processing on two or more adjacent carrier frequencies among the plurality of adjacent carrier frequencies based upon an adjacent carrier power criterion, said parallel baseband processing being adapted for detecting a frequency correction burst in two or more adjacent carrier frequencies.

According to a second aspect of the present invention, there is provided apparatus comprising a processing system constructed and arranged to cause the apparatus to at least: frequency shift a received signal by a first frequency value and low-pass filter the frequency shifted received signal at a first cutoff frequency to filter out a plurality of adjacent carrier frequencies; and perform parallel baseband processing on two or more adjacent carrier frequencies among the plurality of adjacent carrier frequencies based upon an adjacent carrier power criterion, said parallel baseband processing being adapted for detecting a frequency correction burst in two or more adjacent carrier frequencies.

According to a third aspect of the present invention, there is provided a computer program comprising a program of instructions executable by a machine for causing performance of operations, the operations comprising: frequency shifting a received signal by a first frequency value and low-pass filtering the frequency shifted received signal at a first cutoff frequency to filter out a plurality of adjacent carrier frequencies; and performing parallel baseband processing on two or more adjacent carrier frequencies among the plurality of adjacent carrier frequencies based upon an adjacent carrier power criterion, said parallel baseband processing being adapted for detecting a frequency correction burst in two or more adjacent carrier frequencies.

According to a fourth aspect of the present invention, there is provided apparatus comprising: means for frequency shifting a received signal by a first frequency value and low-pass filtering the frequency shifted received signal at a first cutoff frequency to filter out a plurality of adjacent carrier frequencies; and means for performing parallel baseband processing on two or more adjacent carrier frequencies among the plurality of adjacent carrier frequencies based upon an adjacent carrier power criterion, said parallel baseband processing being adapted for detecting a frequency correction burst in two or more adjacent carrier frequencies.

Some examples of embodiments of the present invention provide apparatus, methods, and computer programs that reduce initial cell searching and synchronisation times for a mobile station (MS) (or user equipment (UE) with GSM capabilities) in light of the overlap issue described above.

In an embodiment, the parallel baseband processing is adapted for detecting a frequency correction burst in two or more adjacent Global System for Mobile Communications carrier frequencies or an Enhanced Data Rates for Global System for Mobile Communications Evolution carrier frequencies.

The processing system described above may comprise at least one processor, and at least one memory including computer program code.

There may be provided a computer-readable memory tangibly storing a set of computer instructions as described above.

Further features and advantages of the invention will become apparent from the following description of preferred embodiments of the invention, given by way of example only, which is made with reference to the accompanying drawings.

Some example embodiments of this invention provide apparatus, methods, and computer programs that frequency shift a received signal by a first frequency value and low-pass filters the frequency shifted received signal at a first cutoff frequency to filter out a plurality of adjacent carrier frequencies and perform parallel baseband processing on two or more adjacent carrier frequencies among the plurality of adjacent carrier frequencies based upon an adjacent carrier power criterion. In examples, the parallel baseband processing is adapted for detecting a frequency correction burst in two or more adjacent Global System for Mobile Communications carrier frequencies or an Enhanced Data Rates for Global System for Mobile Communications Evolution carrier frequencies.

As used throughout this specification, adjacent carrier frequencies is defined at one or more carrier frequencies located in proximity to one or more carrier frequencies of interest which can include several of the non-limiting examples shown in FIG. 8 and discussed below.

In one example embodiment, parallel frequency correction channel searching is performed on two adjacent carrier frequencies. In this embodiment parallel frequency correction channel searching comprises frequency shifting a first adjacent carrier signal by a second frequency value, low-pass filtering the frequency shifted first adjacent carrier signal at a second cutoff frequency and frequency shifting the signal by a third frequency value and frequency shifting a second adjacent carrier signal by a second frequency value plus a predetermined offsetting value, low-pass filtering the frequency shifted second adjacent carrier signal at a second cutoff frequency and frequency shifting the signal by a third frequency value.

In another example embodiment, parallel frequency correction channel searching is performed on three adjacent carrier frequencies. In this embodiment parallel frequency correction channel searching comprises frequency shifting a first adjacent carrier signal by a second frequency value, low-pass filtering the frequency shifted first adjacent carrier signal at a second cutoff frequency and frequency shifting the signal by a third frequency value, frequency shifting a second adjacent carrier signal by a second frequency value plus a predetermined offsetting value, low-pass filtering the frequency shifted second adjacent carrier signal at a second cutoff frequency and frequency shifting the signal by a third frequency value and frequency shifting a third adjacent carrier signal by a second frequency value plus a second predetermined offsetting value, low-pass filtering the frequency shifted third adjacent carrier signal at a second cutoff frequency and frequency shifting the signal by a third frequency value.

Prior to describing some example embodiments for the apparatus, methods and computer programs of the present invention, some related terms and concepts will be described.

In Global System for Mobile Communications (GSM) and Enhanced Data Rates for GSM Evolution radio access networks, broadcast channels (BCH) are used to broadcast synchronisation and general network specific information from base transceiver stations (BTS) to all mobile stations (MS) or (user equipment with GSM capabilities) within a cell. In other words, general yet critical connectivity information is needed by the MS to camp on an adjacent BTS to access a GSM network. The BCH carry only downlink information and are responsible primarily for synchronisation and frequency correction. The BCH operates on the downlink of a specific absolute radio-frequency channel number (ARFCN) within each cell. This channel is on irrespective of whether any MS in the cell is listening or not and is transmitted with higher power.

One type of BCH is the frequency correction channel (FCCH) which is the logical channel mainly used for frequency correction to allow the MS to corrects its local clock frequency using this channel. FCCH is also used for synchronisation of an acquisition by providing the boundaries between time slots and the position of the first time slot of a TDMA frame. The FCCH contains a frequency correction burst (FB) which consists of an all-zero bit pattern, which the Gaussian minimum shift keying (GMSK) modulator in the BTS modulates to produce a pure sine wave from the FB at a frequency of around 67.7 kHz (1625/24 kHz) above the carrier centre frequency. The FCCH is used by the MS in the initial stages of BTS acquisition to correct its internal frequency sources and recover the carrier phase of the BTS transmission. This sequence occupies TS0 for every first GSM frame (TDMA frame number 0) in broadcast frequency and is repeated on every 10th TDMA frame within a control channel multi-frame structure. Subsequently, in the digital baseband unit of the MS, a baseband signal is sampled and frequency shifted. After that down-conversion the FB will be a pure sine wave with a frequency of 67.7 kHz plus an unknown frequency offset due to frequency error (e.g. due to drift or jitter).

A FCCH detection algorithm reads the in-phase (I) and quadrature (Q) channels' sampled data output from the GMSK demodulator to search for the pure sine wave sample pattern in the input I, Q sampled data. If it is found then it verifies whether it is the FB or not. As such, the MS determines the frequency deviation from the expected 67.7 kHz frequency and corrects its own clock frequency accordingly. After detecting the FCCH as described above, a Synchronisation Channel (SCH) is decoded to identify the synchronisation burst (SB) which contains information including identifying information of a nearby cell, such as a base station identity code (B SIC), and information for synchronising to that BTS's TDMA structure.

Due to the above described re-farming of 2G (GSM) frequencies to 3G cellular networks (as well as the likely re-farming of 2G frequencies to LTE/LTE-A networks), together with hyper-densification of macrocells, there will be significant overlapping of frequencies with 2G frequencies. As such, the above described decoding of a FCCH to detect a frequency burst will take longer to decode, frustrating the end user and draining the MS's battery.

FIG. 1 shows an example of a wireless communications system 100 suitable for carrying out some example embodiments of the present invention. As shown in FIG. 1, wireless communication system 100 includes a plurality of 2G access points, such as base transceiver stations (BTS) 120-0, 120-1, and 120-2 each adapted for transmitting on the same frequency with user equipment (UE) 110 and accessible to a 2G network such as GSM or EDGE. Also shown in FIG. 1 are a base station controller (BSC) 180 and a Mobile switching centre (MSC) 190 which is adapted for controlling multiple BTSs such as BTS 120-0, 120-1, and 120-2. BSC 180 together with MSC 190 perform tasks such as allocating radio channels, providing frequency administration, power and signal measurements from UE 110, and handovers (e.g. cell reselection) from one BTS to another.

Also, almost within the communication range of UE 110 in FIG. 1 are 3G network access points, such as NodeB 140-0 and NodeB 140-1 and 4G network access points, eNodeB 130-0 and eNodeB 130-1. The 3G and 4G access points are here assumed to be transmitting on the same frequency band as the 2G access points.

Figure 2:
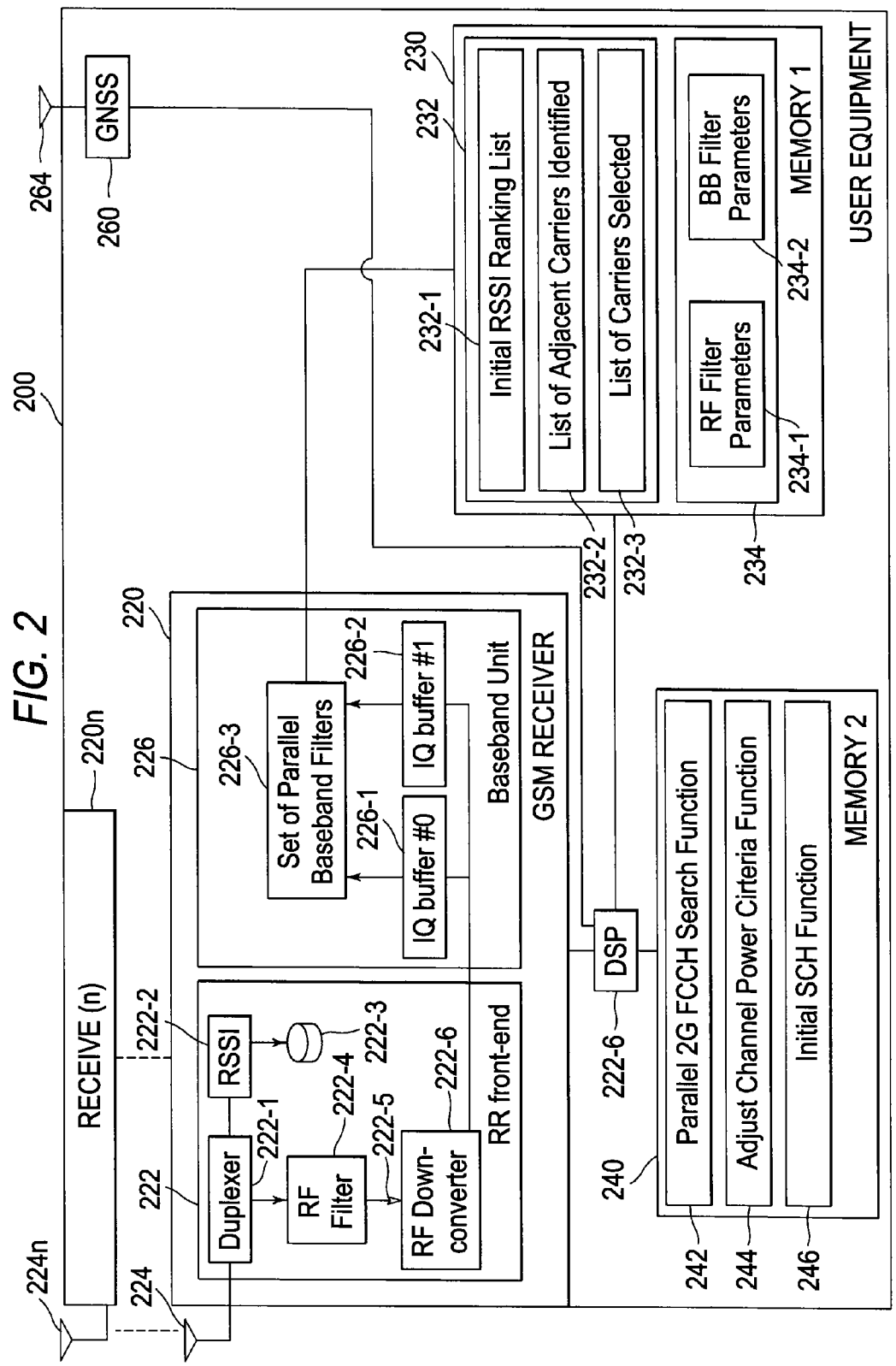
FIG. 2 illustrates a simplified block diagram of a user equipment suitable for use in practising some example embodiments of the invention.

Referring now to FIG. 2, a simplified block diagram of user equipment 200 is shown in accordance with some example embodiments of the present invention. UE 200 includes one or more GSM receivers such as GSM receiver 220 and GSM receiver 220n coupled to antennas 224 and 224n. For simplicity and clarity purposes only the receiver components of a transceiver are shown in FIG. 2. GSM receiver 220 includes an RF front end 222 which includes duplexer 222-1 which among other things isolates a transmitted signal from the received signal in the received band (e.g. to avoid degrading the receiver sensitivity) and attenuate the receiver's spurious responses. Also coupled to duplexer 222-1 is a received signal strength indication measurement device 222-2 which samples the signal power levels of received frequencies and stores this data in buffer memory 222-3. Further coupled to duplexer 222-1 is a radio frequency (RF) filter 222-4 which can include one or more band-pass filters adapted for extracting a desired band of signal from the entire band of the received signal. The output of the RF filter is coupled to a low noise amplifier 222-5 to boost the received signal. An RF down-converter 222-6 is coupled to the low noise amplifier 222-5 to allow baseband processing of the filtered amplified signal.

GSM receiver 220 also includes a baseband unit 226 adapted for receiving signals output from the RF front end 222 by one or more in-phase/quadrature (IQ) buffers such as IQ Buffer #0 226-1 and IQ Buffer #1 226-2. IQ Buffer #0 226-1 and IQ Buffer #1 226-2 are coupled to a plurality of baseband filters, such as a set of parallel baseband (BB) filters 226-3. IQ Buffer #1 226-1 and IQ Buffer #1 226-2 are simplistic characterisations of various hardware components and software functionality adapted to collect samples from the RF front end 222 at for example the GSM symbol rate (e.g. 1 sample per symbol in GMSK producing 270.833 K samples/second). IQ Buffer #1 226-1 and IQ Buffer #1 226-2 may also be adapted for storing and collecting samples at other sample rates.

GSM receiver 220 can be a radio frequency integrated component (RFIC), a discrete component/module or disposed in a system in package (SIP) or otherwise coupled or integrated into mobile terminal or user equipment.

Also shown in FIG. 2, is a Global Navigation Satellite System (GNSS) receiver 260 and GNSS antenna adapted for communicating with a GNSS access point.

As shown in FIG. 2, UE 200 includes one or more processors, including at least one digital signal (DSP) 210, a first computer-readable memory 230, which stores a plurality of parameters in random access memory (RAM) or read only memory (ROM) and a second computer memory 240 tangibly embodying a program of instructions executable by UE 200 and stored in random access memory (RAM) or read only memory (ROM). Although two such computer-readable memories are shown in FIG. 2, example embodiments of the present invention may include only one computer-readable memory or may include more than two computer-readable memories. For example, a first computer-readable memory 230 includes various power level parameters 232 associated with known adjacent GSM carriers frequencies as well as data obtained from buffer 222-2 (e.g. measured RSSI), such as a RSSI Rank List 232-1, a list of adjacent carriers identified 232-2 which includes a list of carrier locations and carrier numbers. In one example embodiment the frequencies in RSSI Ranking List 232-1 correspond to the six (6) strongest non-serving carriers in a BCCH allocation (BA) table (e.g. BA(list) or BA(GPRS)) frequencies obtained in a system information (SI) message (e.g. NC_FREQUENCY_LIST) which can be a list of carriers selected 232-3 in accordance with example embodiments of the present invention. Also included in first computer memory 230 is a list of frequency carriers selected for the parallel FCCH search as described in more detail below with respect to the method and computer operations of example embodiments of the present invention. Also included in first computer memory 230 are filter parameters 234 such as radio frequency filter parameters 234-1 and baseband filter parameters 234-2. For example, in one example embodiment, the radio filter parameters include a frequency offset value of +32.3 kHz and a low-pass filter with a 3 dB cutoff frequency of 130 kHz. In another example embodiment, the radio filter parameters include a frequency offset value of −67.7 kHz and a low-pass with a 3 dB cutoff frequency of 230 kHz. In yet another embodiment, the baseband filter parameters include three baseband frequency offset values of 100 kHz, −100 kHz and 67.7 kHz, and one low-pass filter with a 3 dB cutoff frequency of 30 kHz. In yet another embodiment, the baseband filter parameters include three baseband frequency offset values of 200 kHz, −200 kHz and 67.7 kHz, and one or more low-pass filters with a 3 dB cutoff frequency of 30 kHz.

Second computer memory 240 is provided in UE 200 and includes a parallel FCCH search function 242 as described in more detail below as well as an adjacent channel power criteria function 244 which avoids dynamic signal range issues in case of large power differences among the adjacent frequency carriers of interest. In one example embodiment, the adjacent channel power criteria function 244 evaluates if there are adjacent frequency carriers among the top ranked RSSI frequency carriers stored in buffer 222-2 fulfilling the adjacent channel power criteria function.

Moreover, UE 200 is a wireless communication device such as a mobile station (MS) adapted for solely communicating on a GSM/EDGE RAN or a user equipment adapted for communicating on multiple wireless communication systems not limited to Universal Terrestrial Radio Access Network (UTRAN), Evolved Universal Terrestrial Radio Access Network (EUTRAN) as described in Long Term Evolution/Long Term Evolution Advanced (LTE/LTE-A), a first responder network or other similar radio access networks.

Figure 3:
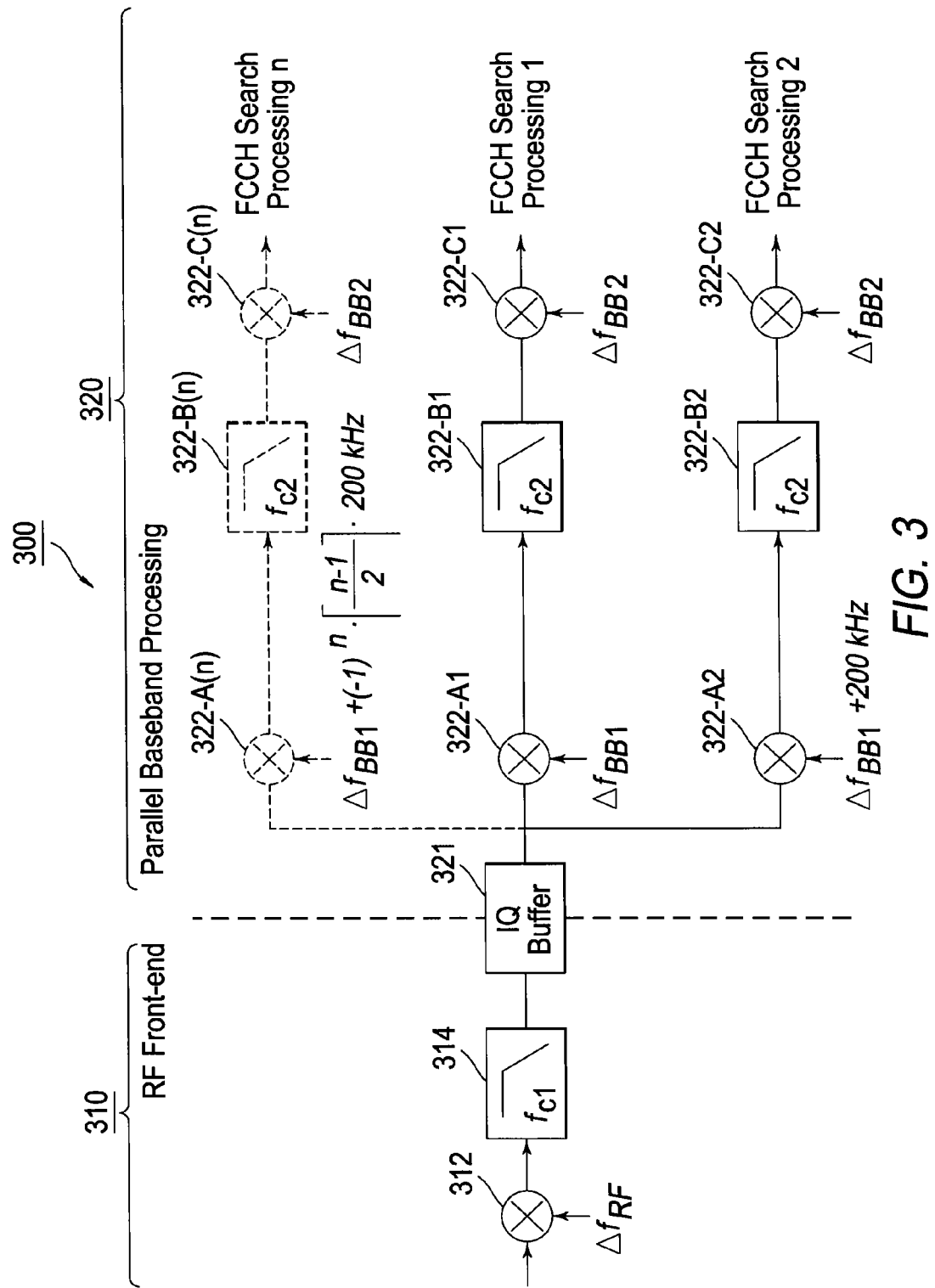
FIG. 3 illustrates a simplified block diagram of a radio frequency filter and the structure of a parallel processing branch, in accordance with some example embodiments of this invention.

Referring now to FIG. 3, an illustration of part of a radio frequency (RF) front-end and a set of parallel baseband filters adapted for providing parallel FCCH searching of up to N adjacent carriers 300 is shown in accordance with some example embodiments of the present invention. FIG. 3 shows an RF filter 310 suitable for receiving a plurality of discrete carrier frequencies from a duplexer (not shown). A frequency shifter 312 is shown adapted to offset the GSM carrier centre frequency with $\Delta f_{RF}$ kHz. Frequency shifter 312 in one example embodiment is an RF mixer adapted to frequency shift received signals using a local oscillator (not shown) to create a plurality of intermediate frequencies. The frequency shifter 312 is coupled to a first low-pass filter 314 adapted for extracting a predetermined first frequency band of signal ($f_{c1}$) from the entire band of the frequency shifted received signal. The low-pass filtered signal contains a plurality of adjacent carrier frequencies which are fed into at least one IQ buffer 321 for further processing. As mentioned above with reference to FIG. 2, an adjacent channel power criteria function 244 prunes the list of adjacent GSM carrier frequencies (e.g. among co-located wideband system frequencies) sampled by a set of parallel baseband branches 320 adapted for extracting specific parts of the GSM frequency bands. That is, some example embodiments of the present invention limit the amount of possible adjacent carrier frequencies to a desired sub-set of adjacent carrier frequencies and thereafter selectively perform a parallel frequency correction channel (FCCH) search on the sub-set of adjacent carrier frequencies fulfilling the criterion or criteria in the adjacent channel power criteria function. In case the adjacent channel power criteria is not fulfilled, the frequency correction channel (FCCH) is searched sequentially carrier by carrier according to their position among the top ranked RSSI frequency carriers.

As such, the set of parallel baseband branches 320 are adapted for selectively searching carrier frequencies by performing up to N parallel FCCH searches on up to N GSM carriers among the plurality of adjacent GSM carrier frequencies by way of four or more mixers and two or more low-pass filters. That is, example embodiments of the present invention extract adjacent carrier frequencies of interest by an individual frequency value bringing the possible FCCH in each adjacent carrier to the same frequency location. Thereafter, the set of parallel baseband branches low-pass filter each of the frequency shifted adjacent carrier frequencies of interest with a similar cutoff frequency and then frequency shift each adjacent carrier of interest by another frequency value.

As shown in FIG. 3, the set of parallel baseband branches 320 includes a first mixer 322-A1 which is suitable for receiving the signal output from low-pass filter 314 and frequency shifting that signal by a first delta baseband carrier frequency ($\Delta f_{BB1}$). That frequency shifted signal is then filtered at a second predetermined low-pass cutoff frequency ($f_{c2}$) in low-pass filter 322-B1. The resulting signal is fed into a second mixer 322-C1 which frequency shifts the low-pass filtered signal by a second delta baseband frequency ($\Delta f_{BB2}$) generating a first adjacent carrier signal for FCCH search processing.

The set of parallel baseband branches 320 also includes a third mixer 322-A2 which is suitable for receiving the signal output from low-pass filter 314 and frequency shifting that signal by the first delta baseband carrier frequency ($\Delta f_{BB1}$) plus a first offset such as for example 200 kHz. That frequency shifted signal is then low-pass filtered at the second predetermined cutoff frequency ($f_{c2}$) in low-pass filter 322-B2. The resulting signal is fed into a fourth mixer 322-C2 which rotates the filtered signal by a second delta baseband frequency ($\Delta f_{BB2}$), generating a second adjacent carrier signal for FCCH search processing.

Also the set of parallel baseband branches 320 are adapted for providing the filtering for more than two adjacent carrier frequencies, here considering the adjacent carrier frequencies n=1, . . . , N. For example, a mixer 322-A(n) is provided which is suitable for receiving the signal output from low-pass filter 314 and frequency shifting that signal by the first delta baseband carrier frequency ($\Delta f_{BB1}$) plus an offset which is a multiple times for example 200 kHz. That is, mixer 322-A(n) is adapted in accordance with Equation No. 1 set forth below:

$$\Delta f_{BB1} + (-1)^n \cdot \left[\frac{n-1}{2}\right] \cdot 200 \text{ kHz} \qquad \text{(Equation No. 1)}$$

That frequency shifted signal output from mixer 322-A(n) is then low-pass filtered at the second predetermined cutoff frequency ($f_{c2}$) in low-pass filter 322-B(n). The resulting signal is fed into a mixer 322-C(n) which frequency shifts the filtered signal by a second delta baseband frequency ($\Delta f_{BB2}$) generating a n'th adjacent carrier signal for FCCH search processing.

It should be noted that offsets shown in FIG. 3 are merely illustrative examples provided for describing one or more possible example embodiments of the present invention. As such, the 200 kHz offset shown in FIG. 3 applies if the carrier frequency of interest to be searched (e.g. a search for the FCCH) is the adjacent GSM carrier located 200 kHz above the "reference" GSM carrier. In another example embodiment (not shown), the set of parallel branch processing could support a search of four parallel carrier frequencies, where the offset in the fourth branch could be either −400 or +400 kHz depending on whether the fourth carrier centre is located either +400 or −400 kHz above the "reference" GSM carrier.

Moreover, some example embodiments of the present invention shown in FIG. 3 are suitable for 1×, 2× or higher oversampling factors of adjacent carrier signals of interest. That is, the N-branch parallel structure shown in FIG. 3 can run in a "two parallel mode" if only two adjacent carriers are searched in parallel in accordance with an example embodiment described below. In this example embodiment, the adjacent carrier frequency locations determine which parallel branches to use (e.g. if the adjacent carrier frequencies are located 200 kHz apart, the upper and lower branch processing is required). So actually, with a three branch parallel structure as illustrated according to FIG. 3, two FCCH searches can be done even though they are not directly adjacent but contains a single non-relevant carrier in between (which we don't want to search for FCCH).

To ensure that FCCH search processing can be done as if operating on a normal GSM carrier frequency, each baseband branch in FIG. 3 is balanced according to Equation No. (2):

$$\Delta f_{BB2} = -\Delta f_{RF} - \Delta f_{BB1} + \Delta f \qquad \text{(Equation No. 2)}$$

where $\Delta f$ is the overall frequency shift before FCCH processing. The value of $\Delta f$ may be selected as desirable for an implementation. For example, $\Delta f=0$ kHz if no additional frequency offset is desired or $\Delta f=-67.7$ kHz if GMSK derotation is incorporated at this point. In the following, $\Delta f=0$ kHz is assumed.

The resulting N adjacent carrier frequencies shown in FIG. 3 are then fed into one or more FCCH search processing functions (e.g. FCCH Search Processing 1, FCCH Search Processing 2 . . . FCCH Search Processing n) such as an initial synchronisation function 246 shown in FIG. 2.

Figure 4A:
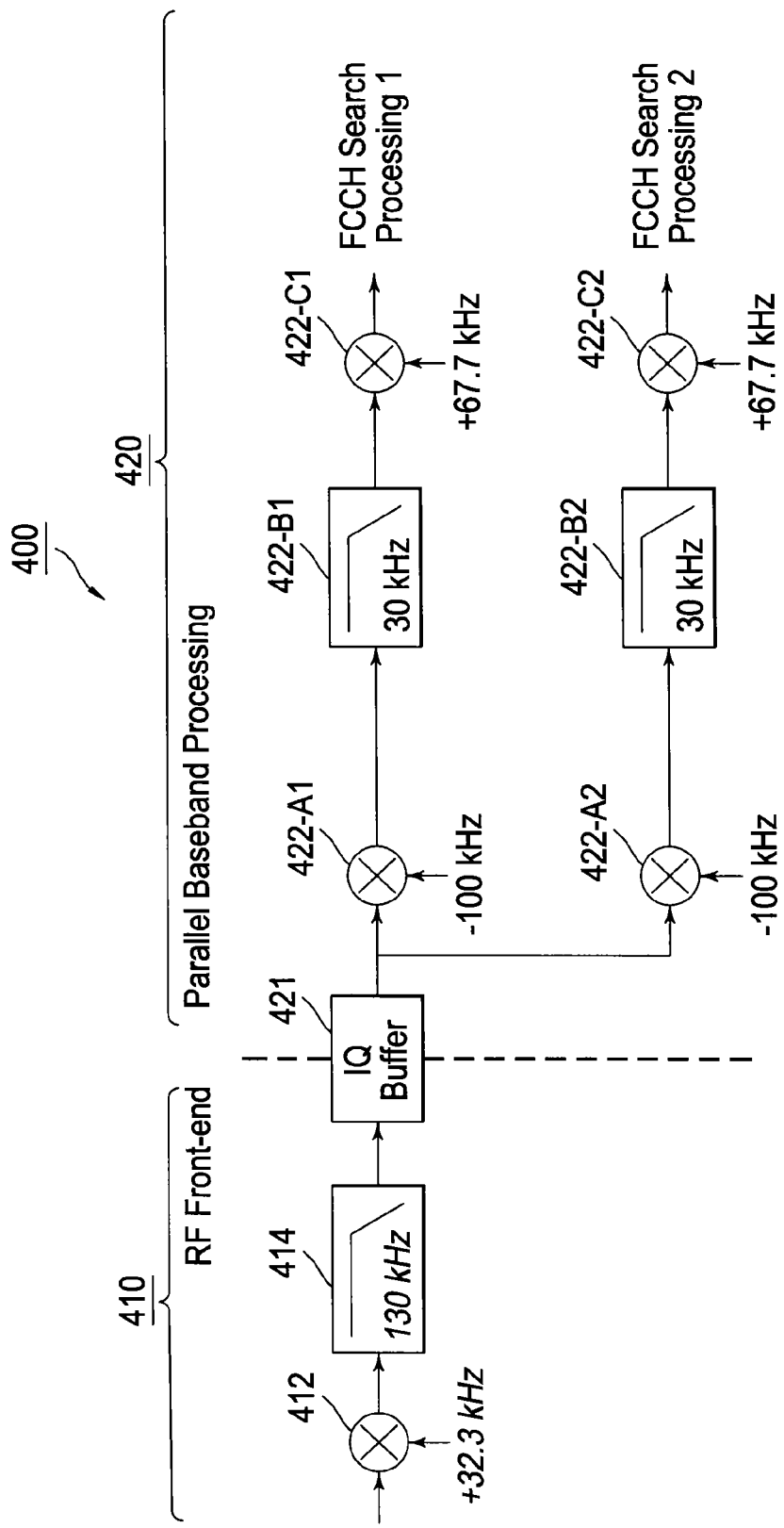
FIG. 4(a) illustrates a simplified block diagram of a radio frequency filter and the structure of two parallel processing branches, in accordance with one example embodiment of this invention.
Figure 4B:
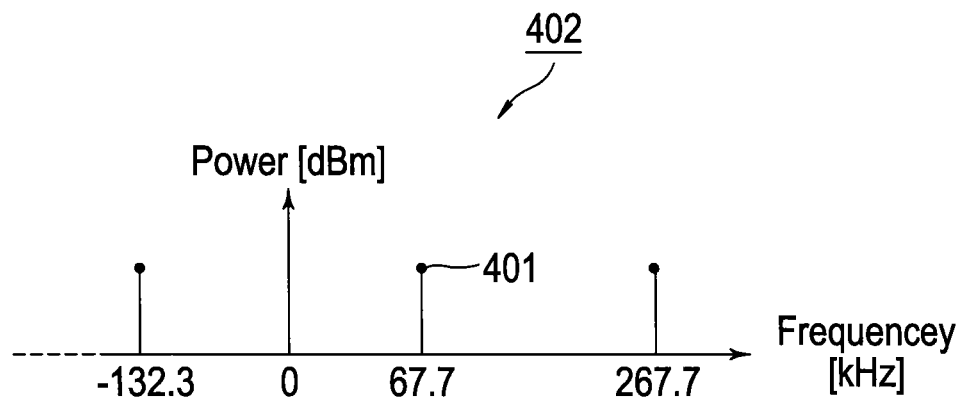
FIG. 4(b) illustrates a non-limiting example of an expected location of the frequency correction channel (FCCH) on two or more adjacent GSM carrier frequencies (e.g. spacing is 200 kHz)
Figure 4C:
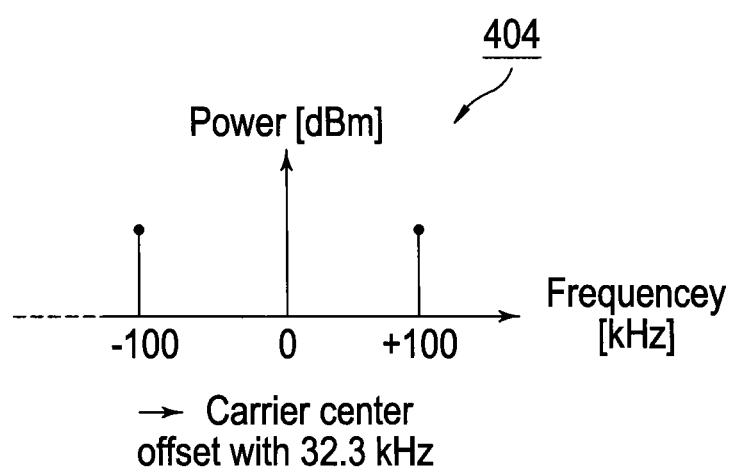
FIG. 4(c) illustrates another non-limiting example of the expected location of two FCCH channels on two adjacent GSM carrier frequencies, in accordance with one example embodiment of this invention.

Referring now to FIGS. 4(a) to 4(c), a first example embodiment of a two branch parallel FCCH search 400 is shown in accordance with some example embodiments of the present invention. As shown in FIG. 4(a), an RF front-end 410 includes an frequency shifter 412 suitable for receiving a plurality of discrete carrier frequencies and frequency shifting that frequency by +32.3 kHz compared to the reference carrier frequency. Frequency shifter 412 in one example embodiment is an RF mixer adapted to frequency shift received signals using a local oscillator (not shown) to create a plurality of intermediate frequencies. Coupled to frequency shifter 412 is a first low-pass filter 414 which has a 3 dB cutoff frequency of 130 kHz. The filtered signal contains a plurality of two adjacent carrier frequencies as a result of frequency shifting resulting in a plurality of I/Q signals which are fed into at least one IQ buffer such as IQ buffer 421 for further processing. As mentioned above in reference to FIG. 2, an adjacent power criterion function 244 prunes the list of adjacent carrier frequencies sampled by a set of two parallel baseband processing branches 420.

As mentioned above, example embodiments of the present invention shown in FIG. 3 only require one IQ buffer 421 for the proposed parallel FCCH search on two or more adjacent frequency carriers. In some embodiments, configurations could include more than one IQ buffer. The use of just one IQ buffer is possible because the FCCH is transmitted on the broadcast control channel (BCCH) carriers located 67.7 kHz above the carrier frequency (e.g. 67.7 kHz, 267.7 kHz). In one example embodiment, each individual baseband processing branch of the set of two parallel baseband processing branches 420 is adapted to a minimum and maximum frequency variation above and below 267.7 kHz.

As shown in FIG. 4(*a*) in this non-limiting two-branch example embodiment, the frequency centre is offset with +32.3 kHz by the RF front-end 410, which reduces the required frequency band to (67.7+32.3)+30 kHz=130 kHz (single-sided) (e.g. the cutoff frequency of RF filter 414) where the 30 kHz is here used as an example of the frequency uncertainty of the receiver's local oscillator. As shown in FIG. 4(*b*), expected locations of the frequency burst 402 are shown before the frequency shifter 412. For example, the frequency correction burst 401 is shown at 67.7 kHz as well as at −132.3 kHz and 267.7 kHz. As such RF low-pass filter 414 has a 3 dB cut-off frequency adapted to pass a frequency bandwidth of 130 kHz (single-sided). In FIG. 4(*c*), the resulting frequency burst 404 after frequency shifter 412 and low-pass filter 414 is shown. It should be noted that FIG. 4(*c*) is merely an illustration of a non-limiting example of expected locations of the frequency burst for describing the present invention. If another offset (e.g. not +32.3 kHz as shown in FIG. 4(*a*)) is applied, the FCCH positions will differ from that shown in FIG. 4(*c*). However, the position of each FCCH will still be located within 200 kHz of each other.

The set of two parallel baseband processing branches 420 are adapted for selectively separating two carrier frequencies among the plurality of adjacent carrier frequencies by way of four mixers and two low-pass filters, each configured with a 3 dB cutoff frequency of 30 kHz. As shown in FIG. 4(*a*), the set of two parallel baseband processing branches 420 includes a first mixer 422-A1 which is suitable for receiving the signal output from low-pass filter 414 and frequency shifting that signal by −100 kHz. That frequency shifted signal is then low-pass filtered at the 3 dB cutoff frequency of 30 kHz in low-pass filter 422-B1. The resulting signal is fed into a second mixer 422-C1 which frequency shifts the filtered signal by +67.7 kHz extracting the frequency range of interest for the first FCCH search branch.

Also, the set of two parallel baseband processing branches 420 also includes a third mixer 422-A2 which is suitable for receiving the signal output from low-pass filter 414 and frequency shifting that signal by 100 kHz. That frequency shifted signal is then low-pass filtered at the 3 dB cutoff frequency of 30 kHz in low-pass filter 422-B2. The resulting signal is fed into a fourth mixer 422-C2 which frequency shifts the filtered signal by +67.7 kHz extracting the frequency range of interest for the second FCCH search branch.

As the set of two parallel baseband processing branches 420 is configured with a +32.3 kHz carrier frequency offset in RF filter 410, the two FCCH carriers will be located at −100 kHz and +100 kHz for the scenarios were no frequency error is present. For example, as shown in FIG. 4(*c*), frequency carriers are offset by +32.3 kHz (404). A worst case drift (+/−15 ppm @1900 MHz band) is +/−28.5 kHz, here rounded up to +/−30 kHz used for determining the filter bandwidths.

The resulting first and second adjacent carrier frequencies are then fed into an initial synchronisation software processing (e.g. FCCH Search Processing 1 and FCCH Search Processing 2), such as an initial synchronisation function 246 shown in FIG. 2. The initial synchronisation function 246 is described in more detail below with respect to the methods and computer operations of the present invention in conjunction with FIG. 9, FIG. 10 and FIG. 11.

Figure 5A:
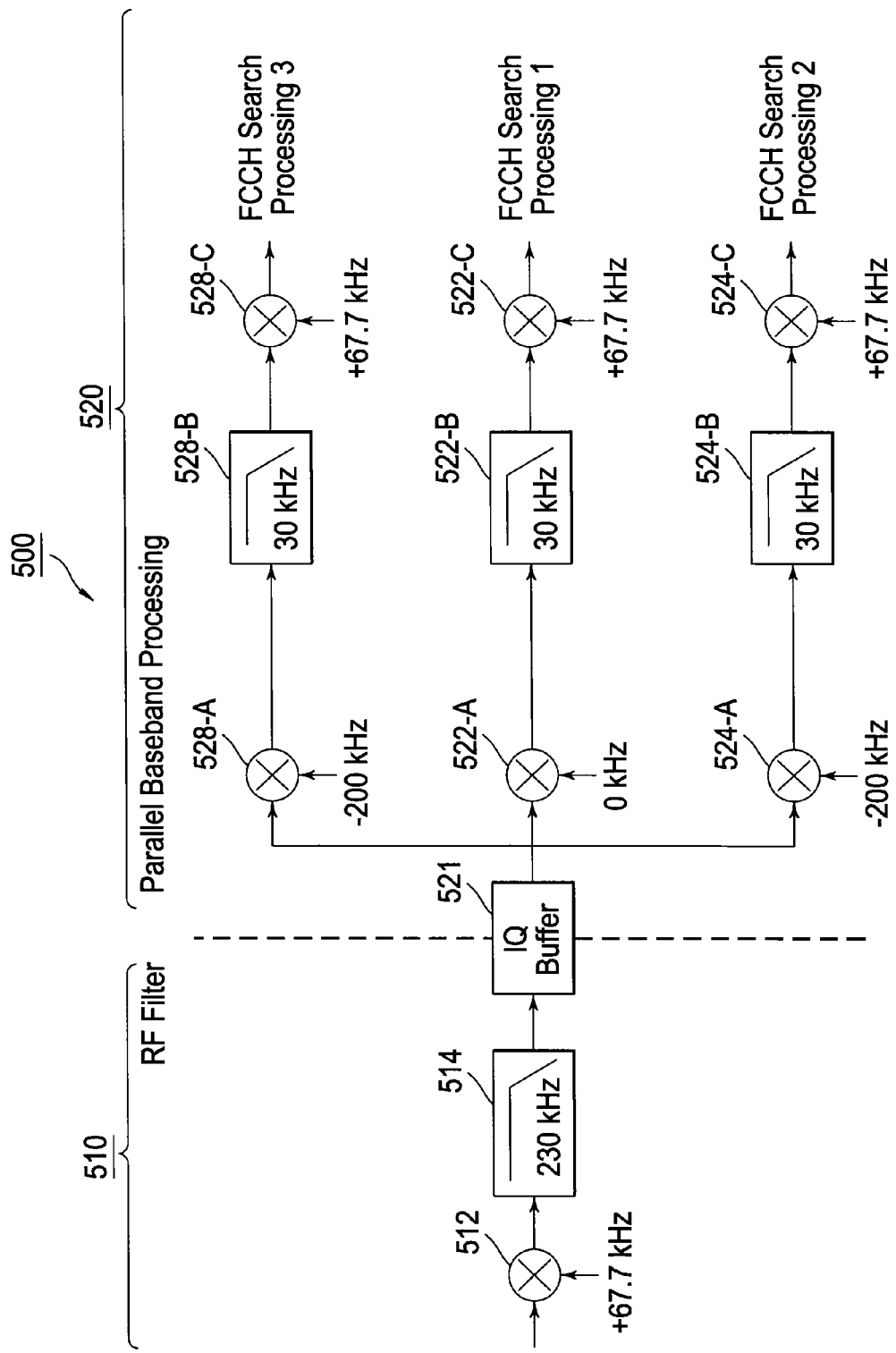
FIG. 5(a) illustrates a simplified block diagram of a radio frequency filter and three parallel processing branches, in accordance with one example embodiment of this invention.
Figure 5B:
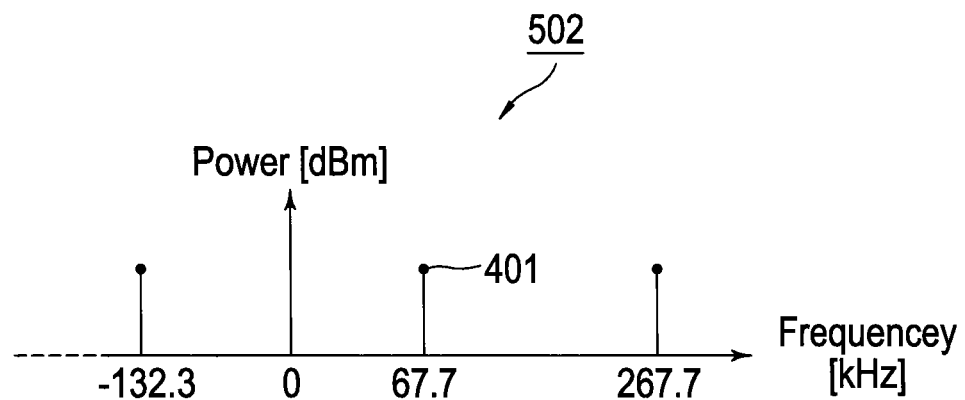
FIG. 5(b) illustrates the location of three or more adjacent GSM carrier frequencies, in accordance with one example embodiment of this invention.
Figure 5C:
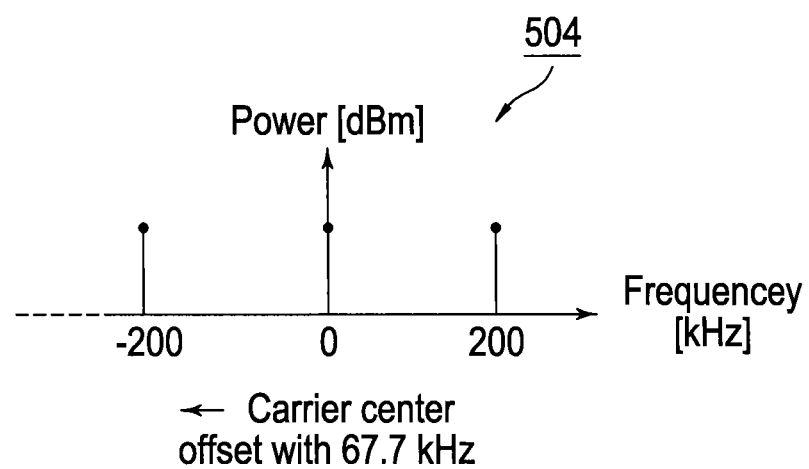
FIG. 5(c) illustrates another non-limiting example of the location of three adjacent carrier frequencies, in accordance with one example embodiment of this invention.

Referring now to FIGS. 5(*a*) to 5(*c*), a second example embodiment of a three branch parallel FCCH search 500 is shown in accordance with some example embodiments of the present invention. As shown in FIG. 5(*a*), an RF front-end 510 includes a frequency shifter 512 suitable for receiving a plurality of discrete carrier frequencies and frequency shifting that frequency by −67.7 kHz compared to the reference carrier frequency. Frequency shifter 512 in one example embodiment is an RF mixer adapted to frequency shift received signals using a local oscillator (not shown) to create a plurality of intermediate frequencies. Coupled to frequency shifter 512 is a first low-pass filter 514 which has a 3 dB cut-off frequency of 230 kHz. The filtered signal contains a plurality of three adjacent carrier frequencies as a result of frequency shifting, resulting in a plurality of I/Q signals which are fed into at least one IQ buffer such as IQ buffer 521 for further processing. An adjacent channel power criteria function, as described in more detail below with respect to the example methods and computer program, prunes a list of adjacent carrier frequencies sampled by a set of three parallel processing branches 520.

As shown in FIG. 5(*a*) in this non-limiting three-branch example embodiment, the frequency centre is offset with −67.7 kHz by the RF front-end 510, which reduces the required frequency band to (67.7−67.7)+30 kHz+200 kHz=230 kHz (single sided) (e.g. the cutoff frequency of RF filter 514) where the 30 kHz is here used as an example of the frequency uncertainty of the receiver's local oscillator, and 200 kHz is the BCCH carrier spacing. As shown in FIG. 5(*b*), expected frequency locations of the frequency bursts 502 are shown before the frequency shifter 512. For example, the frequency correction bursts 502 are shown at 67.7 kHz as well as at −132.3 kHz and 267.7 kHz. As such, RF low-pass filter 514 has a 3 dB cut-off frequency adapted to pass a frequency bandwidth of 230 kHz (single-sided). In FIG. 5(*c*) the resulting frequency burst 504 after frequency shifter 512 and low-pass filter 514 is shown. It should be noted that FIG. 5(*c*) is merely an illustration of a non-limiting example of expected locations of the frequency burst for describing the present invention. If another offset (e.g. not −67.7 kHz as shown in FIG. 5(*a*)) is applied, the FCCH positions will differ from that shown in FIG. 5(*c*). However, the position of each FCCH will still be located within 200 kHz of each other.

In this example embodiment, only a single IQ buffer 521 is required for a parallel FCCH search on up to three adjacent frequency carriers. In some embodiments, configurations could include more than one IQ buffer. The FCCH is transmitted on the broadcast control channel (BCCH) carriers located 67.7 kHz above the carrier frequency (e.g. 67.7 kHz, 267.7 kHz). Accordingly, the use of only one IQ buffer for searching up to three FCCHs on adjacent carriers is possible as long as the Nyquist-Shannon sampling theorem is fulfilled which e.g. applies for a sampling frequency of twice the GSM symbol rate.

The set of three parallel baseband processing branches 520 are adapted for selectively separating three carrier frequencies among the plurality of adjacent carrier frequencies by way of six mixers and three low-pass filters, each of which in this example embodiment is configured with a 3 dB cutoff frequency of 30 kHz. As shown in FIG. 5(*a*), in this example embodiment the set of three parallel baseband processing branches 520 includes a first mixer 522-A which is suitable for receiving the signal output from low-pass filter 514 and frequency shifting that signal by 0 kHz. That signal is then low-pass filtered at the 3 dB cutoff frequency of 30 kHz in low-pass filter 522-B. The resulting signal is in this example embodiment fed into a second mixer 522-C which frequency shifts the filtered signal by +67.7 kHz, extracting the frequency range of interest for the first FCCH search branch.

Also, in this example embodiment the set of three parallel baseband processing branches 520 also includes a third mixer 524-A which is suitable for receiving the signal output from low-pass filter 514 and frequency shifting that signal by 200 kHz. In this example embodiment that frequency shifted signal is then low-pass filtered at the 3 dB cutoff frequency of 30 kHz in low-pass filter 524-B. The resulting signal is in this example embodiment fed into a fourth mixer 524-C which frequency shifts the filtered signal by +67.7 kHz, extracting the frequency range of interest for the second FCCH search branch.

In addition, in this example embodiment the set of three parallel baseband processing branches 520 also includes a fifth mixer 528-A which is suitable for receiving the signal output from low-pass filter 514 and frequency shifting that signal by −200 kHz. In this example embodiment that frequency shifted signal is then low-pass filtered at the 3 dB cutoff frequency of 30 kHz in low-pass filter 528-B. The resulting signal is in this example embodiment fed into a sixth mixer 528-C which frequency shifts the filtered signal by +67.7 kHz, extracting the frequency range of interest for the third FCCH search branch.

All three baseband low-pass filters (522-B, 524-B, and 528-B) are in this example embodiment configured with identical 3 dB cut-off frequencies for each of the three branches. The cut-off frequency is set as low as possible to remove as much noise as possible from the signal before initiating the FCCH search processing.

The relation between the delta frequency offsets in FIG. 5(*a*) follow Equation No. 2 set forth above ($\Delta f_{BB2} = -\Delta f_{RF} - \Delta f_{BB1}$). For example, if $\Delta f_{BB1} = 0$ kHz, and $\Delta f_{RF} = -50$ kHz, then $\Delta f_{BB2} = +50$ kHz. Another illustrative example is that if the FCCH location after $\Delta f_{BB1}$ is say 17.7 kHz and the required worst case frequency offset expected is say 30 kHz, the 3 dB low-pass baseband filters should be adapted with a cut-off frequency greater than 17.7+30 kHz=47.7 kHz.

As shown in FIG. 5(*a*), the resulting first, second and third frequency range of interest for the FCCH searches (e.g. FCCH Search Processing 1, FCCH Search Processing 2 and FCCH Search Processing 3) are fed into traditional initial synchronisation software processing such as an initial synchronisation function 246 shown in FIG. 2 and described in more detail below with respect to the methods and computer operations of the present invention in conjunction with FIG. 6, FIG. 7 and FIG. 8. Regarding the "FCCH search processing" operations, these are identical for all three branches (e.g. the same parameter settings can be used as described below with respect to the methods and computer operations of the present invention).

Moreover, the three branch parallel structure shown in FIG. 5(*a*) can run in a "two parallel mode" also if only two adjacent carriers are searched in parallel in accordance with the adjacent channel power criteria function described below. In this example embodiment, the adjacent carrier frequency locations determine which of the three parallel branches to use (e.g. if the identified carrier frequencies identified for the parallel FCCH searching are located 200 kHz apart, the upper and lower branch processing is required). That is, with the three branch parallel structure illustrated according to FIG. 5(*a*), two FCCH searches can be done even though the carriers are not directly adjacent but contain a single non-relevant carrier in between (which is not applicable for the FCCH search).

The adjacent channel power criteria function mentioned above is adapted for pruning a list of ranked RSSI carrier frequencies sampled by RF filter 310, 410 or 510. That is, the adjacent channel power criteria function configures the parallel baseband processing suitable for handling the output from the RF filter (e.g. RF filter shown in FIG. 3 (Ref. #310), FIG. 4 (Ref. #410) and FIG. 5(*a*) (Ref. #510)). As such, the adjacent channel power criteria function sets-up the parallel processing to follow (e.g. determining how many branches to execute: one branch, two branches, three or more branches, etc.). Thus the adjacent channel power criteria function complexity depends on the number of parallel branches supported, with the adjacent channel power criteria function required for the two branch structure in FIG. 4 being the least complex. In some instances, where no suitable adjacent carrier frequencies are found among the ranked RSSIs, only a single processing branch will be used followed by a single FCCH search (e.g. FIG. 3 (Ref. #310), FIG. 4 (Ref. #410) or FIG. 5(*a*) (Ref. #510)). In one example embodiment, a list of adjacent carrier frequencies are stored in tabular form in one or more memories such as for example first computer memory 230 as shown in FIG. 2 as a result of the execution of adjacent channel power criteria function 244 by DSP 210. In another embodiment, the RSSI list is further pruned based upon the latest stored BA (BCCH), that is, frequency and related cell information stored in memory prior to the UE's latest switch off in accordance with section 4.8 of 3GPP TS 43.022. In another embodiment, the RSSI list is further pruned based upon a current geographic location of the user equipment as determined by connecting to a Global Navigation Satellite System (GNSS) and comparing that location to a locally stored database of known GSM frequencies in that current geographic location.

Figure 6A:
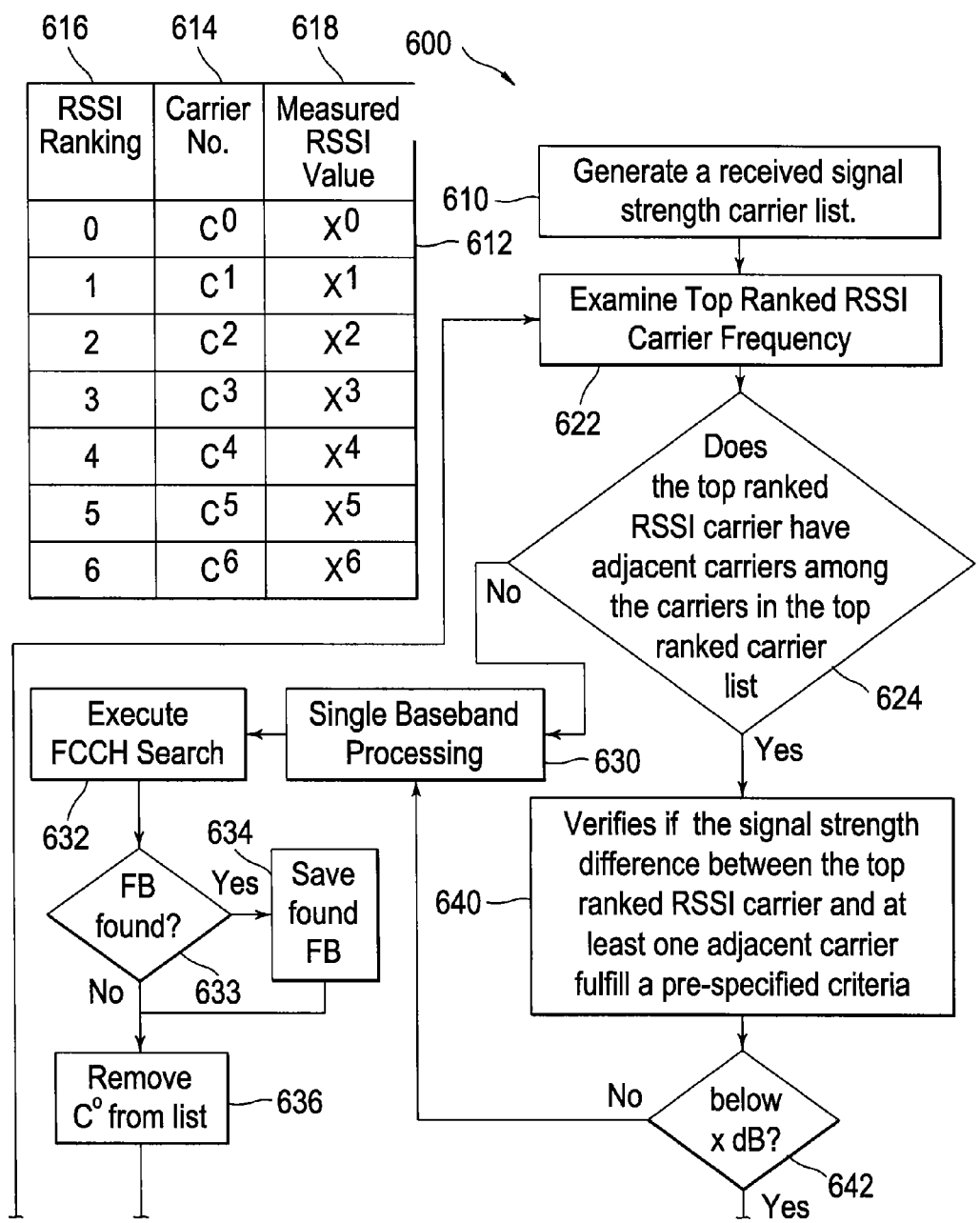
FIG. 6 is a flow diagram that illustrates the operation of a two parallel FCCH processing branch architecture method, and a result of execution of computer program instructions embodied on a computer-readable memory of a user equipment, in accordance with some exemplary embodiments of this invention.
Figure 6B:
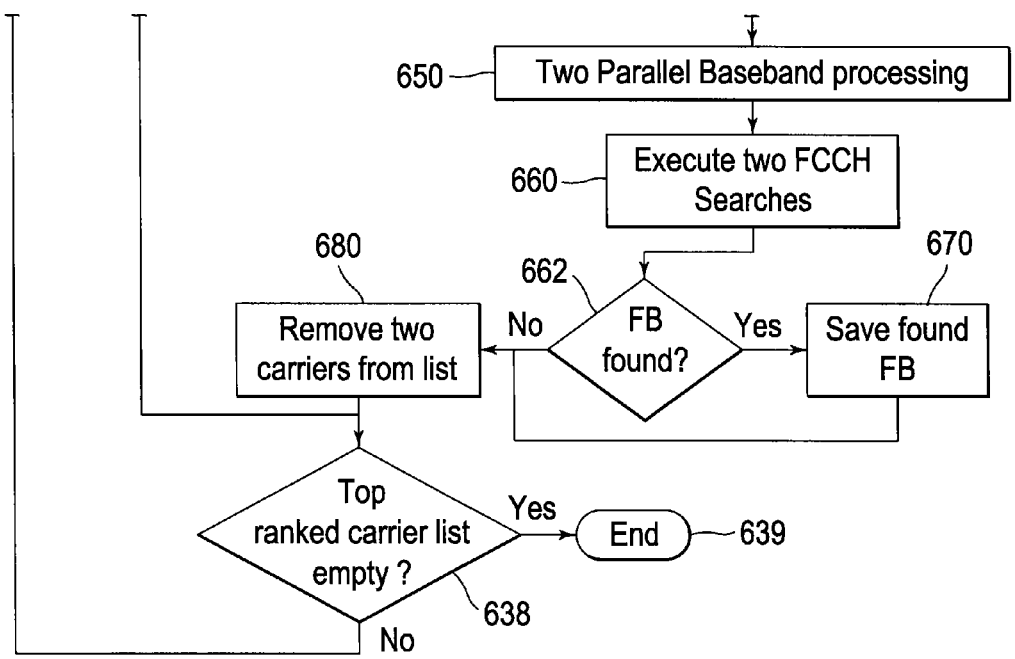

FIG. 6 shows an example flow diagram of an adjacent channel power criteria adapted for employing two parallel baseband processing branches (600) as shown in FIG. 4(*a*) in accordance with one example embodiment of the present invention. In this example embodiment, the adjacent channel power criteria function first generates a RSSI table 610 as appreciated by one skilled in the art such as table 612 provided for illustration purposes showing a non-limiting example of seven (7) top ranked frequencies carriers $C^0$ to $C^6$ (614) ranked 0 to 6 (616) according to their measured received signal strength RSSI value (dBs) $C^0$ to $X^6$ (618). In one example embodiment, the function begins by examining the top ranked RSSI carrier $C^0$ in table 612 to determine if the list contains any (i.e. zero, one or two) adjacent frequency carriers located next to the top ranked carrier 624. This is done by utilising the frequency carrier information of each of the carriers included in the ranked RSSI list. To identify if there is a single adjacent frequency carriers next to $C^0$, the carrier locations/numbers, RSSI rank and RSSI values are stored in one or more memories as shown in FIG. 2. If no adjacent frequency carriers are identified among the top ranked RSSI carriers, the top ranked carrier frequency is fed into a single baseband processing branch 630 and the resulting filtered single signal is fed into a FCCH search 632. If a frequency burst (FB) is found 633, the user equipment stores the found FB information 634 for subsequent BTS camping. Alternatively, if the FB is not found, the top ranked RSSI carrier frequency $C^0$ is removed from the list 636 and it then checks if the top ranked list is empty 638. If "Yes", the top ranked carrier list is empty and the function terminates 639; if "No", the new top ranked RSSI carrier frequency is examined 622 and the steps are repeated. In one example embodiment the FB search is continued after one or more FBs are found whereas in another embodiment the search may be stopped when at least one FB is found.

In another example of the embodiment, a single adjacent frequency carrier is identified 624 and the adjacent channel power criteria function verifies if the signal strength difference between the two carriers fulfils a pre-specified criterion 640. In one example embodiment, the pre-specified criterion is a threshold such as below x dBs 642 where x is a positive value. If this criterion is fulfilled ("Yes"), a FCCH search on both carriers (the top ranked carrier and the identified adjacent carrier) is done in parallel 650. Otherwise, if the criterion 642 is not fulfilled, the FCCH search is done first on the top ranked single carrier 630 as described above and shown in FIG. 6. If no frequency burst (FB) is found 662 on the searched carriers, both carriers are removed from the list (e.g. "pruned") 680 and it is checked if the top ranked list is empty 638. If "Yes", the top ranked carrier list is empty and the function terminates 639; if "No", the next top ranked carrier frequency is examined 622. Otherwise, if a FB is found 662, the user equipment stores the found FB information 670 for subsequent BTS camping. In one embodiment, the subsequent steps for camping on the BTS are scheduled for this carrier associated with the FB. In another embodiment where carriers are associated with multiple FBs, the UE can attempt to camp on multiple cells at the same time.

In another example of the embodiment, two adjacent frequency carriers are identified 624 and the adjacent channel power criteria function verifies if the signal strength difference between the top ranked carrier and the stronger of the two identified adjacent carriers 640 fulfils a pre-specified criterion 642. If this criterion is fulfilled ("Yes"), a FCCH search on both carriers (the top ranked carrier and the strongest identified adjacent carrier) is done in parallel 650 as described above. Otherwise, if the criterion 642 is not fulfilled, the FCCH search is done first on the top ranked single carrier 630 as described above and shown in FIG. 6. If no frequency burst (FB) is found 662 on the searched carriers, both carriers are removed from the list (e.g. "pruned") 680 and it is checked if the top ranked list is empty 638. If "Yes", the top ranked carrier list is empty and the function terminates 639; if "No", the next top ranked carrier frequency is examined 622. Otherwise if a FB is found on one of the two searched carriers, the user equipment stores the found FB information 670 for subsequent BTS camping. In case a FB is found on both of the two searched carriers, the user equipment stores the found FB information 670 for both carriers for subsequent BTS camping. In one embodiment, the subsequent steps for camping on the BTS are scheduled for this carrier associated with the FB. In another embodiment where carriers associated with multiple FBs are detected, the UE can attempt to camp on multiple cells at the same time.

In another example of the embodiment, two adjacent frequency carriers are identified with equal or close to equal signal strength 624, and the adjacent channel power criteria function verifies if the signal strength difference between the top ranked carrier and the two identified adjacent carriers 640 fulfils a pre-specified criterion 642. If this criterion is fulfilled ("Yes"), it randomly selects one of the two identified adjacent carriers and a FCCH search on both carriers (the top ranked carrier and the selected adjacent carrier) is done in parallel 650 as described above. Otherwise, if the criterion 642 is not fulfilled, the FCCH search is done first on the top ranked single carrier 630 as described above and shown in FIG. 6. In another example embodiment, either the lower or upper located adjacent carrier would always be selected for the two parallel baseband processing branches 650 for the FCCH search 660 if a pre-specified criterion 642 is fulfilled. In yet another example embodiment, the lower and upper adjacent carrier would be regularly selected between for the two parallel baseband processing branches 650 for the FCCH search 660 if a pre-specified criterion 642 is fulfilled. If no frequency burst (FB) is found 662 on the searched carriers, both carriers are removed from the list (e.g. "pruned") 680 and it is checked if the top ranked list is empty 638. If "Yes", the top ranked carrier list is empty and the function terminates 639; if "No", the next top ranked carrier frequency is examined 622. Otherwise, if a FB is found on one of the two searched carriers, the user equipment stores the found FB information 670 for subsequent BTS camping. In case a FB is found on both of the two searched carriers, the user equipment stores the found FB information 670 for both carriers for subsequent BTS camping. In one embodiment, the subsequent steps for camping on the BTS are scheduled for this carrier associated with the FB. In another embodiment, where carriers associated with multiple FBs are detected, the UE can attempt to camp on multiple cells at the same time.

Figure 7A:
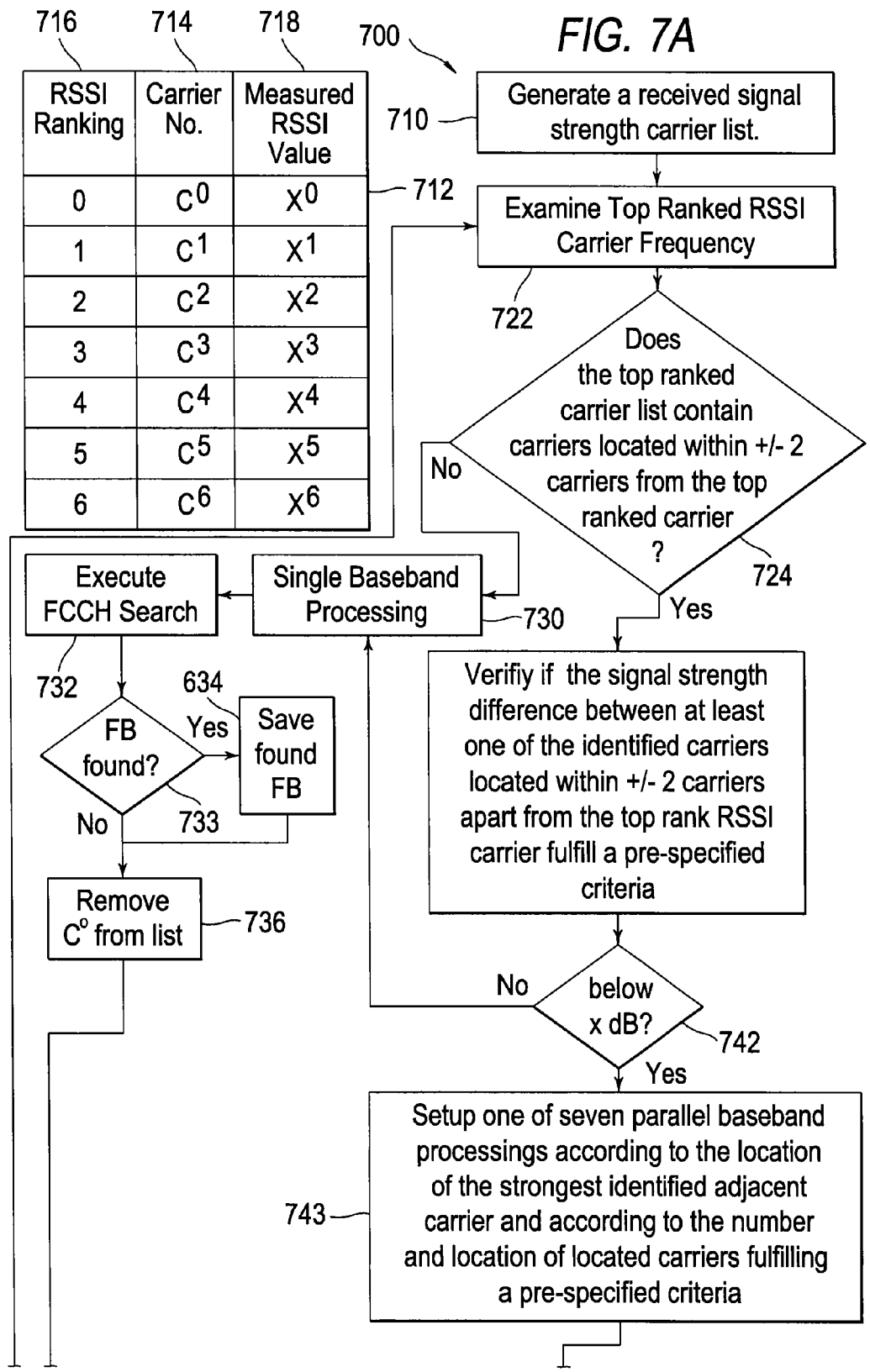
FIG. 7 is a flow diagram that illustrates the operation of a three parallel FCCH processing branch architecture method, and a result of execution of computer program instructions embodied on a computer-readable memory of a user equipment, in accordance with some exemplary embodiments of this invention.
Figure 7B:
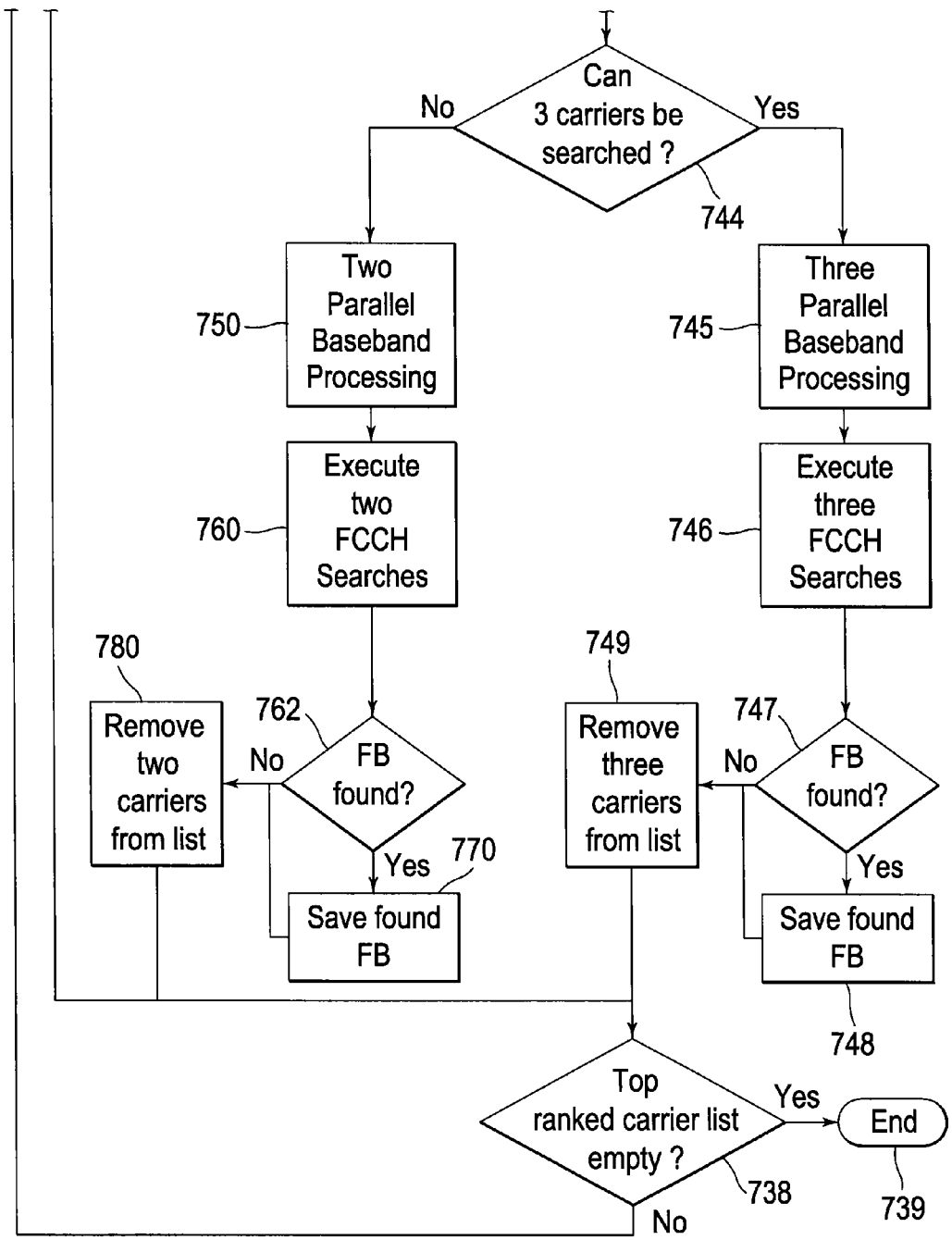

FIG. 7 shows an example flow diagram of an adjacent channel power criterion adapted for employing three parallel baseband processing branches as shown in FIG. 5(*a*) (500) in accordance with one example embodiment of the present invention. In this example embodiment, the adjacent channel power criteria function first generates a RSSI table 710 as appreciated by one skilled in the art such as table 712 provided for illustration purposes showing a non-limiting example of seven (7) top ranked frequencies carriers $C^0$ to $C^6$ (714) ranked 0 to 6 (716) according to their measured received signal strength RSSI value (dBs) $C^0$ to $X^6$ (718). In one example embodiment, the function begins by examining the top ranked RSSI carrier frequency $C^0$ in table 712 to determine if the list contains any (i.e. zero, one or two) adjacent carrier frequencies next to the top ranked carrier 724. This is done by utilising the carrier frequency information of each of the carriers included in the ranked RSSI list. To identify if there are adjacent carrier frequencies next to $C^0$, the carrier locations/numbers, RSSI rank and RSSI values are stored in one or more memories as shown in FIG. 2. If no adjacent frequency carriers are identified among the top ranked RSSI carriers, the top ranked carrier frequency is fed into a single baseband processing branch 730 and the resulting filtered single is fed into a FCCH search 732. If a frequency burst (FB) is found 733, the user equipment stores the found FB information 734 for subsequent BTS camping. Alternatively, if the FB is not found, the top ranked RSSI carrier frequency $C^0$ is removed from the list 736 and it then checks if there are any carriers left in the top ranked list 738. If "no", the top ranked carrier list is empty and the function terminates 739; if "yes", the new top ranked RSSI carrier frequency is examined 722 and the steps are repeated. In one example embodiment, the FB search is continued after one or more FBs are found whereas in another embodiment the search may be stopped when at least one FB is found.

In another example of the embodiment, the top ranked carrier list is found to contain carriers located within +/−2 carriers apart from the top ranked carrier 740 and adjacent channel power criteria function verifies if the signal strength difference between any of the identified carriers fulfils a pre-specified criterion 742. In one example embodiment, the pre-specified criterion is a threshold below x dBs, e.g. x=15 dBs. If the criterion is not fulfilled the top ranked carrier frequency is fed into a single baseband processing branch 730 and the resulting filtered single is fed into a FCCH search 732 as described above. If the pre-specified criterion 742 is fulfilled, at least two or three carriers can be searched in parallel and 743 configures the parallel baseband processing branches accordingly to the location of the strongest detected carrier located within +/−2 carriers apart from the top ranked carrier. In total, seven different parallel processing branch configurations are possible with the three branch parallel processing architecture. The seven different configurations are shown in FIG. 8 and described below. In 744, the number of parallel branch processing to be done is checked. In one example embodiment, two carriers are to be searched 750 (the top ranked carrier and the identified carrier located within +/−2 carriers apart from the top ranked carrier), and the FCCH searches are done on two carriers in parallel 760. If no frequency burst (FB) is found 762 on the searched carriers, both carriers are removed from the list (e.g. "pruned") 780 and it is checked if the top ranked list is empty 738. If "Yes", the top ranked carrier list is empty and the function terminates 739; if "No", the next top ranked carrier frequency is examined 722. Otherwise if a FB is found 762, the user equipment stores the found FB information 770 for subsequent BTS camping. In case a FB is found on both of the searched carriers, the user equipment stores the found FB information 770 for both carriers for subsequent BTS camping. In another example embodiment, three carriers are to be searched 745 (the top ranked carrier and two additional carriers spanning over 3 carriers including the top ranked carrier), and the FCCH searches are done on three carriers in parallel 746. If no frequency burst (FB) is found 747 on the searched carriers, the three carriers are removed from the list (e.g. "pruned") 749 and it is checked if the top ranked list is empty 738. If "Yes", the top ranked carrier list is empty and the function terminates 739; if "No", the next top ranked carrier frequency is examined 722. Otherwise if a FB is found 747, the user equipment stores the found FB information 748 for subsequent BTS camping. In case a FB is found on two or three of the three searched carriers, the user equipment stores the found FB information 748 for the found carriers for subsequent BTS camping. In one embodiment, the subsequent steps for camping on the BTS are scheduled for this carrier associated with the FB. In another embodiment, where carriers associated with multiple FBs are detected, the UE can attempt to camp on multiple cells at the same time.

Figure 8:
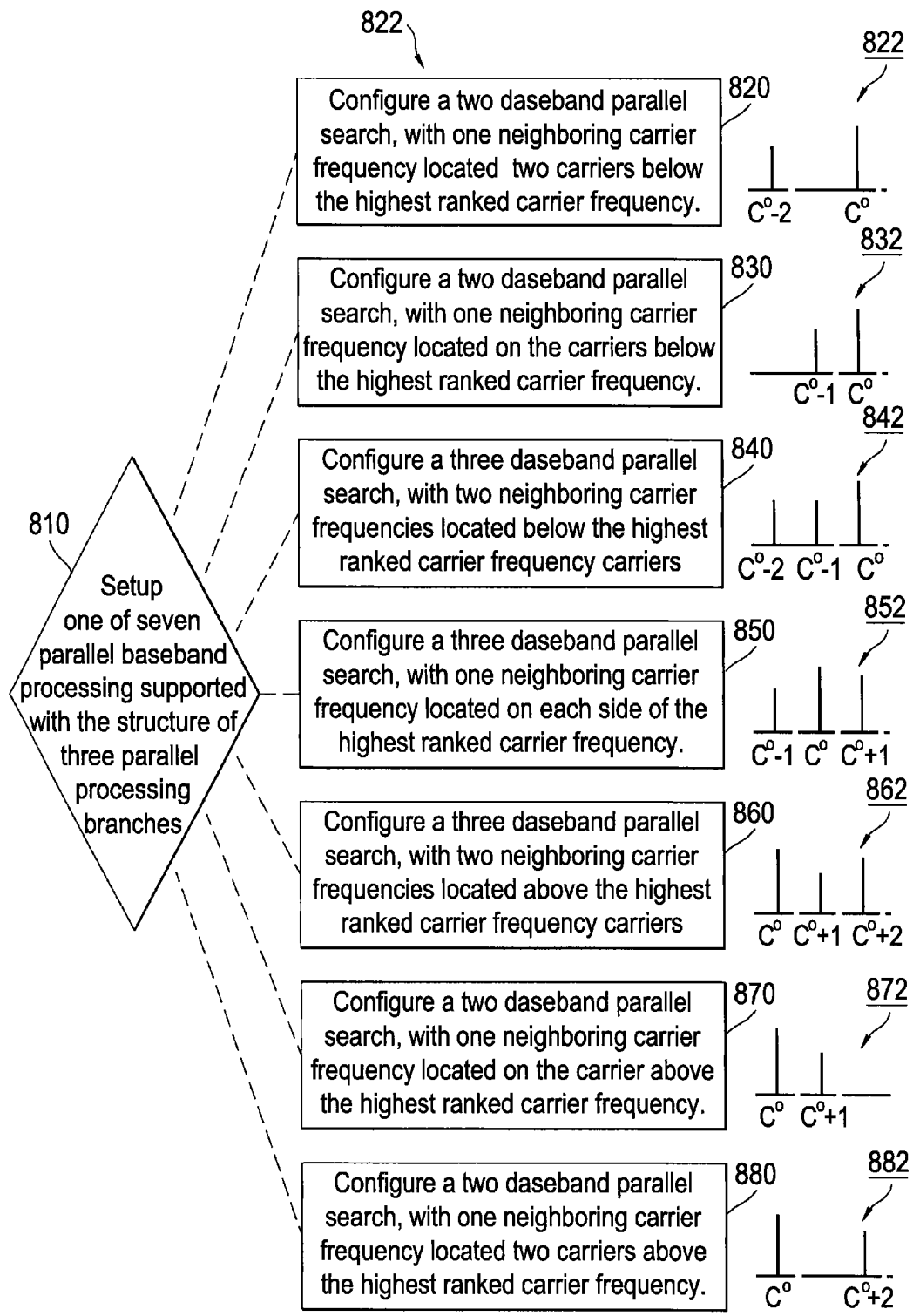
FIG. 8 is a flow diagram that illustrates the operation of a parallel processing configuration of the three parallel FCCH processing branch architecture method, and a result of execution of computer program instructions embodied on a computer-readable memory of a user equipment, in accordance with some exemplary embodiments of this invention.

FIG. 8 shows an illustration example of the above described seven different parallel processing branch configurations 743, 744, 750 and 745, supported with the structure of the three parallel baseband processing branches as shown in FIG. 5(*a*) (500) in accordance with one example embodiment of the present invention. In FIG. 8, the function 810 can set up one of the seven configurations 820, 830, 840, 850, 860, 870 and 880. In one example embodiment, the function 810 evaluates four neighbouring carrier frequencies located around the highest ranked carrier (+/−2 carriers apart from the top ranked carrier) in the received signal strength carrier list for the three branch parallel baseband processing (and then subsequent FCCH searching 750 or 745 on the output of either two parallel baseband processing 750 or three parallel baseband processing 745, respectively as described above). The function 810 evaluates the position of the strongest neighbouring carrier. In one example of the embodiment, the strongest neighbouring carrier is located plus or minus two carriers apart from the top ranked carrier, and hence the possible configurations of 810 are thus limited to configuration 820, 840, 860 or 880 with the carrier locations illustrated as examples in 822, 842, 862 or 882 respectively. In one example of the embodiment, the function 810 evaluates if a neighbouring carrier has also been found at the frequency location in between the strongest detected neighbouring channel and the top ranked carrier. If a neighbouring carrier is found at this location, the adjacent channel power criteria function evaluates if that neighbouring carrier also fulfils the pre-specified signal strength difference criterion or not. If the criterion is fulfilled, the possible configurations of 810 are thus configuration 840 or 860, depending on whether the strongest detected neighbouring carrier was located below or above the carrier frequency of the top ranked carrier as depicted in 842 or 862 respectively. For the three parallel baseband processing, 744 selects 745 and proceeds as described above. In another example of the embodiment, the function 810 does not find a neighbouring carrier at the frequency location in between the strongest detected neighbouring channel and the top ranked carrier which fulfils the pre-specified signal strength difference criterion, and hence the possible configurations of 810 are thus configuration 820 or 880, depending on whether the strongest detected neighbouring carrier was located below or above the carrier frequency of the top ranked carrier as depicted in 822 or 882 respectively. For the two parallel baseband processing, 744 selects 750 and proceeds as described above.

In another example of the embodiment, 810 finds the strongest neighbouring carrier to be located next to the top ranked carrier, and hence the possible configurations of 810 are thus limited to configuration 830, 840, 850, 860 or 870 with the possible carrier locations illustrated as examples in 832, 842, 852, 862 or 872 respectively. In one example of the embodiment, the function 810 evaluates if a neighbouring carrier has been found at the frequency location next to the strongest detected neighbouring channel (two carriers apart from the top ranked carrier) or on the opposite side of the top ranked carrier. If a neighbouring carrier is found on one of these locations, the adjacent channel power criteria function evaluates if that neighbouring carrier also fulfils the pre-specified signal strength difference criterion or not. If a neighbouring carrier is found on both frequencies and both fulfil the pre-specified signal strength difference criterion, the strongest carrier is selected. In one example of the embodiment, no additional carrier fulfilling the pre-specified signal strength difference criterion was found and the possible configurations of 810 are thus configuration 830 or 870, depending on the location of the detected neighbouring carrier i.e. located below or above the carrier frequency of the top ranked carrier as depicted in 832 or 872 respectively. For the two parallel baseband processing, 744 selects 750 and proceeds as described above. In another example of the embodiment, the function 810 finds a second neighbouring carrier on the opposite side of the top ranked carrier which fulfils the pre-specified signal strength difference criterion, and hence the possible configuration of 810 is thus configuration 850, with the carrier locations depicted in 852. For the three parallel baseband processing, 744 selects 745 and proceeds as described above.

In another example of the embodiment, 810 also finds the strongest neighbouring carrier to be located next to the top ranked carrier, and hence the possible configurations of 810 are also limited to configuration 830, 840, 850, 860 or 870 with the possible carrier locations illustrated as examples in 832, 843, 854, 865 or 876 respectively. In one example of the embodiment, the function 810 finds a neighbouring carrier at the frequency location next to the strongest detected neighbouring channel (located two carriers apart from the top ranked carrier) which also fulfils the pre-specified signal strength difference criterion. In this example, the possible configurations of 810 are thus configuration 840 or 860, depending on the location of the detected neighbouring carrier i.e. located below or above the carrier frequency of the top ranked carrier as depicted in 842 or 862 respectively. For the three parallel baseband processing, 744 selects 745 and proceeds as described above.

In another example embodiment, the adjacent channel power criteria function is adapted to support an N branch structure, that is, an architecture containing four or more parallel processing branches as shown in FIG. 3. In this embodiment, the adjacent channel power criteria function is suitable for processing each adjacent carrier in parallel provided each neighbouring carrier frequency is within the carrier frequency range supported by architecture shown in FIG. 3. In this embodiment as is the case in all embodiments, the adjacent channel criteria function is employed to configure the parallel baseband processing operations that follow (e.g. how many branches to execute, four, five, six, etc.).

In some example embodiments, the pre-specified signal strength criterion relative to the top ranked carrier included in the adjacent channel power criteria function mentioned above is specified in terms of one or more threshold criteria. In one example embodiment, the accepted signal power difference is below 15 dB between the top ranked carrier and the neighbouring carrier(s) found suitable for the parallel baseband processing and parallel FCCH searches that follow.

Also, in some example embodiments, if the frequency correction burst is not detected in first adjacent carrier frequency, second adjacent carrier frequency, and third adjacent carrier frequency, each carrier frequency's location and/or carrier's number are removed from the top ranked received signal strength carrier list, yielding an updated top ranked list. Next one, two or more top ranked adjacent carrier frequencies are evaluated with the adjacent channel power criteria function to configure and initiate the parallel baseband processing and parallel FCCH searches on the next set of top ranked adjacent carrier frequencies.

Also, in some example embodiments, if no adjacent carrier frequency fulfilling the adjacent channel power criteria function is found next to the top ranked carrier frequency in the received signal strength carrier list, a single FCCH search is performed. If no FCCH is found, the carrier frequency location and/or carrier number is removed from the list, yielding an updated top ranked list. It is then checked if there are zero, one, two or more neighbouring carrier frequencies next to the new top ranked carrier frequency in the received signal strength carrier list and so forth. If one or more adjacent carrier frequencies are evaluated positively with the adjacent channel power criteria function 244, the parallel baseband processing and parallel FCCH searches are done for two or more carriers. Otherwise the baseband processing for a single carrier and a single FCCH search is done.

Figure 9:
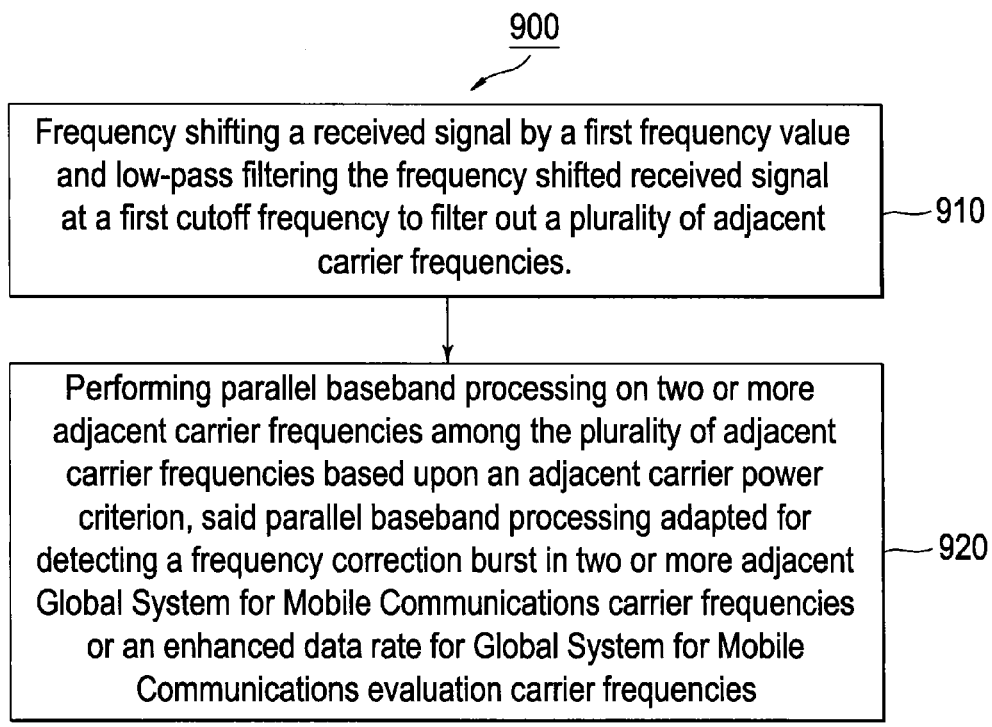
FIG. 9 is a flow diagram that illustrates the operation of a method, and a result of execution of computer program instructions embodied on a computer-readable memory of a user equipment suitable for executing a number of parallel FCCH searches, in accordance with some exemplary embodiments of this invention.

Referring now to FIG. 9, a block diagram is provided to illustrate the operation of an example of a method and a result of execution of computer program instructions tangibly embodied on a computer-readable memory 900 suitable for carrying out some example embodiments of the present invention. The methods, and computer programs, provide frequency shifting a received signal by a first frequency value and low-pass filtering the frequency shifted received signal at a first cut-off frequency to filter out a plurality of adjacent carrier frequencies (910); and performing parallel baseband processing on two or more adjacent carrier frequencies among the plurality of adjacent carrier frequencies based upon an adjacent carrier power criteria adapted for detecting a frequency correction burst in two or more adjacent carrier frequencies (920). In one example embodiment, the parallel baseband processing is adapted for detecting a frequency correction burst in two or more adjacent Global System for Mobile Communications carrier frequencies or an Enhanced Data Rates for Global System for Mobile Communications Evolution carrier frequencies.

Figure 10:
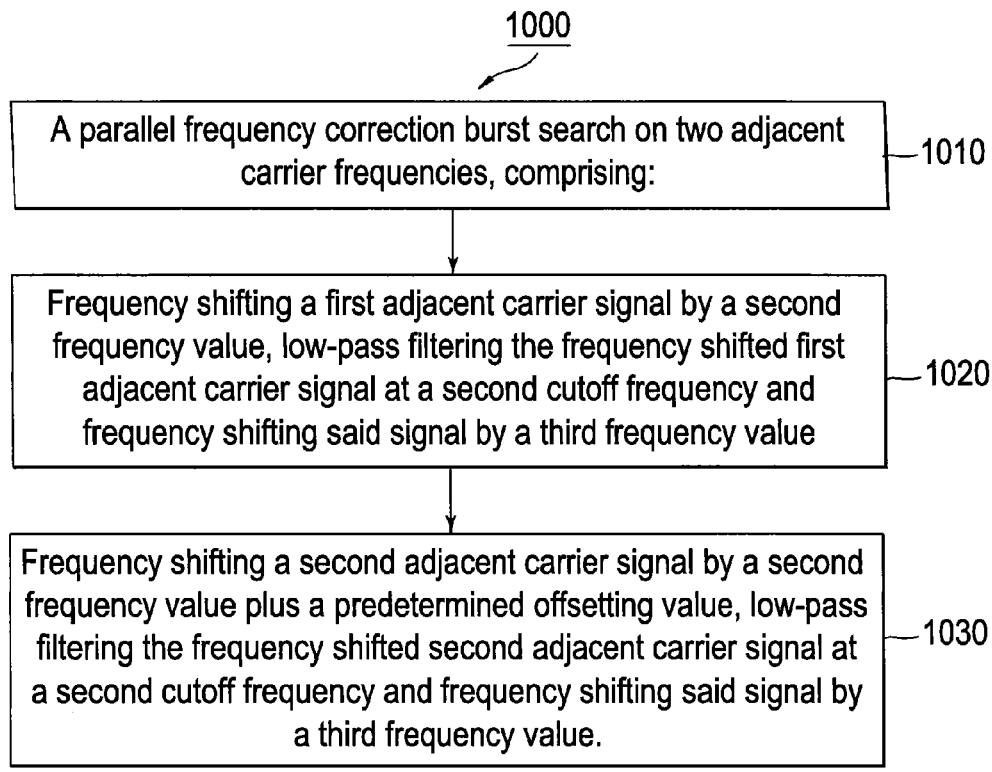
FIG. 10 is a flow diagram that illustrates the operation of a method, and a result of execution of computer program instructions embodied on a computer-readable memory of a user equipment suitable for executing a set of two parallel FCCH searches, in accordance with some exemplary embodiments of this invention.

In one example embodiment shown in FIG. 10, the parallel baseband processing (1000) further comprises a parallel FCCH search on two adjacent carrier frequencies (1010), comprising frequency shifting a first adjacent carrier signal by a second frequency value, low-pass filtering the frequency shifted first adjacent carrier signal at a second cut-off frequency and frequency shifting said signal by a third frequency value (1020) and frequency shifting a second adjacent carrier signal by a second frequency value plus a predetermined offsetting value, low-pass filtering the frequency shifted second adjacent carrier signal at a second cut-off frequency and frequency shifting said signal by a third frequency value (1030).

Figure 11:
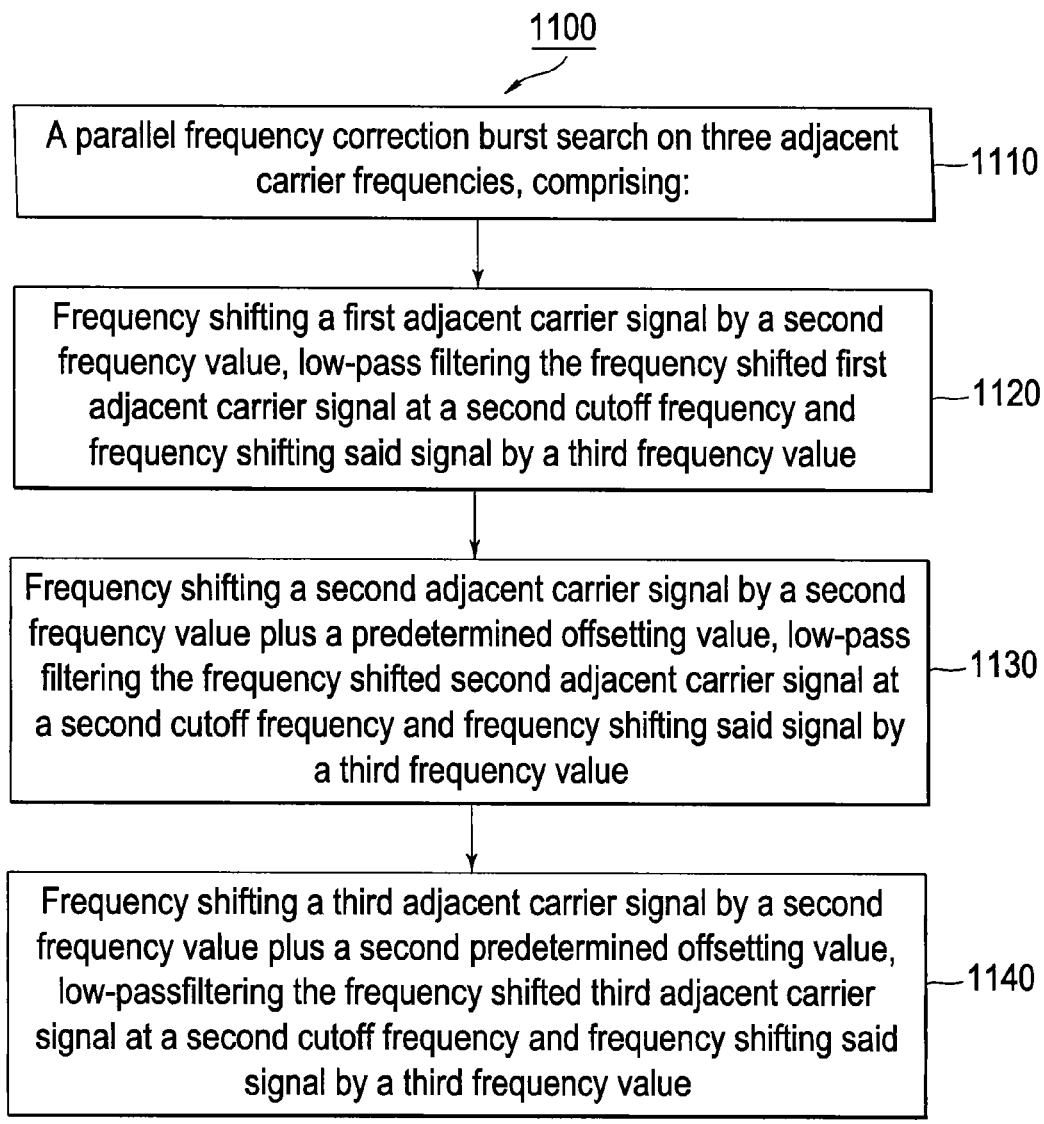
FIG. 11 is a flow diagram that illustrates the operation of a method, and a result of execution of computer program instructions embodied on a computer-readable memory of a user equipment suitable for executing a set of three parallel FCCH searches, in accordance with some exemplary embodiments of this invention.

In another example embodiment shown in FIG. 11, the parallel baseband processing further comprises a parallel FCCH search on two adjacent carrier frequencies 1110), comprising frequency shifting a first adjacent carrier signal by a second frequency value, low-pass filtering the frequency shifted first adjacent carrier signal at a second cut-off frequency and frequency shifting said signal by a third frequency value (1120), frequency shifting a second adjacent carrier signal by a second frequency value plus a predetermined offsetting value, low-pass filtering the frequency shifted second adjacent carrier signal at a second cut-off frequency and frequency shifting said signal by a third frequency value (1130) and frequency shifting a third adjacent carrier signal by a second frequency value plus a second predetermined offsetting value, low-pass filtering the frequency shifted third adjacent carrier signal at a second cut-off frequency and frequency shifting said signal by a third frequency value (1140).

In some example embodiments, the first 3 dB low-pass filter cut-off frequency is 130 kHz and the second 3 dB low-pass filter cut-off frequency is 30 kHz. In another example embodiment, the first 3 dB low-pass filter cut-off frequency is 230 kHz and the second 3 dB low-pass filter cut-off frequency is 30 kHz.

In some example embodiments, the adjacent carrier power criteria comprises determining if the received signal strength of at least one adjacent carrier frequency is located among one or more top ranked received signal strength carrier frequencies, wherein each frequency carrier's location and/or carrier's number is stored in memory together with each measured power level and in a top ranked received signal strength carrier list.

Also, in some example embodiments, if the frequency correction burst is not detected in a first adjacent carrier frequency, second adjacent carrier frequency, and third adjacent carrier frequency, each carrier frequency's location and/or carrier's number are removed from the top ranked received signal strength carrier list and a next one, two or more top ranked adjacent carrier frequencies are selected and the FCCH search is performed on those top ranked adjacent carrier frequencies. In some example embodiments, the top ranked adjacent carrier frequencies are indicators of one or more closely located base transceiver station (BTS) in communication range of an user equipment.

Various embodiments of the computer readable memory such as those shown in FIGS. 2 to 5 include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the data processors include, but are not limited to, general purpose computers, special purpose computers, microprocessors, digital signal processors (DSPs) and multi-core processors.

As used in this specification, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically presence. This definition of "circuitry" applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" would also cover, for example, and if applicable to the particular claim element, a baseband integrated circuit or application specific integrated circuit for a mobile phone or a similar integrated circuit in server, a cellular network device, or other network device. The reference throughout this disclosure to a user equipment (UE) may be embodied in a smart phone, a cellular phone, a personal digital assistant (PDA), a wireless modem, a wireless communication device, a laptop, a netbook, a tablet or any other device capable of communicating with an FirstNet, E-UTRAN, UTRAN or GERAN enabled device.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method, the method comprising:
   frequency shifting a received signal by a first frequency value and low-pass filtering the frequency shifted received signal at a first cutoff frequency to filter out a plurality of adjacent carrier frequencies; and
   performing parallel baseband processing on two or more adjacent carrier frequencies among the plurality of adjacent carrier frequencies based upon an adjacent carrier power criterion, said parallel baseband processing being adapted for detecting a frequency correction burst in two or more adjacent carrier frequencies.

2. The method according to claim 1, wherein the parallel baseband processing comprises a parallel frequency correction burst search on two adjacent carrier frequencies, the parallel frequency correction burst search comprising:
   frequency shifting a first adjacent carrier signal by a second frequency value, low-pass filtering the frequency shifted first adjacent carrier signal at a second cutoff frequency and frequency shifting said signal by a third frequency value; and
   frequency shifting a second adjacent carrier signal by a second frequency value plus a predetermined offsetting value, low-pass filtering the frequency shifted second adjacent carrier signal at a second cutoff frequency and frequency shifting said signal by a third frequency value.

3. The method according to claim 2, wherein the parallel frequency correction burst search on three adjacent carrier frequencies further comprises:
   frequency shifting a third adjacent carrier signal by a second frequency value plus a second predetermined offsetting value, low-pass filtering the frequency shifted third adjacent carrier signal at a second cutoff frequency and frequency shifting said signal by a third frequency value.

4. The method according to claim 3, wherein the first cutoff frequency is one of 130 kHz and 230 kHz at 3 decibels and the second cutoff frequency is 30 kHz at 3 decibels.

5. The method according to claim 1, wherein the performing parallel baseband processing based upon the adjacent carrier power criterion comprises:
   determining if the received signal strength of at least one adjacent carrier frequency is located proximately to a top ranked received signal strength carrier frequency,
   wherein at least one of each frequency carrier's location and carrier's number is stored in memory together with each measured power level in a top ranked received signal strength carrier list.

6. The method according to claim 5, further comprising:
   determining if an adjacent frequency carrier is next to the top ranked received signal strength carrier frequency, and
   in response to determining that a single adjacent frequency carrier is found next to the top ranked received signal strength carrier frequency, verifying that a signal strength difference fulfils a pre-specified criterion, wherein if the pre-specified criterion is fulfilled, executing two parallel baseband processing on the adjacent frequency carrier and top ranked carrier frequency, and
   in response to determining that no adjacent frequency carriers are identified among top ranked received signal strength indicator carriers, feeding the top ranked carrier frequency into a single baseband processing branch.

7. The method according to claim 5, further comprising:
   determining if two adjacent frequency carriers are next to the top ranked received signal strength carrier frequency, and
   in response to determining that two adjacent frequency carriers are not next to the top ranked received signal strength carrier frequency, executing two parallel baseband processing on two neighboring frequency carriers, and
   in response to determining that two adjacent frequency carriers are next to the top ranked received signal strength carrier frequency, verifying that a signal strength difference between the two adjacent frequency carriers and the top ranked received signal strength carrier frequency fulfill a pre-specified criterion, and, if the pre-specified criterion is fulfilled, setting up at least one of a plurality of parallel baseband processing branches according to the location of a strongest identified adjacent frequency carrier and according to a number and location of located frequency carriers fulfilling the pre-specified criterion, wherein three parallel baseband processing is executed if three frequencies carriers can be searched else two parallel baseband processing is executed.

8. An apparatus comprising:
a processing system comprising at least one processor arranged to cause the apparatus to at least:
frequency shift a received signal by a first frequency value and low-pass filter the frequency shifted received signal at a first cutoff frequency to filter out a plurality of adjacent carrier frequencies; and
perform parallel baseband processing on two or more adjacent carrier frequencies among the plurality of adjacent carrier frequencies based upon an adjacent carrier power criterion, said parallel baseband processing being adapted for detecting a frequency correction burst in two or more adjacent carrier frequencies.

9. The apparatus according to claim 8, arranged such that the parallel baseband processing comprises a parallel frequency correction burst search on two adjacent carrier frequencies, the parallel frequency correction burst search comprising:
frequency shifting a first adjacent carrier signal by a second frequency value, low-pass filtering the frequency shifted first adjacent carrier signal at a second cutoff frequency and frequency shifting said signal by a third frequency value; and
frequency shifting a second adjacent carrier signal by a second frequency value plus a predetermined offsetting value, low-pass filtering the frequency shifted second adjacent carrier signal at a second cutoff frequency and frequency shifting said signal by a third frequency value.

10. The apparatus according to claim 8, arranged such that the parallel baseband processing comprises a parallel frequency correction burst search on three adjacent carrier frequencies, the parallel frequency correction burst search comprising:
frequency shifting a first adjacent carrier signal by a second frequency value, low-pass filtering the frequency shifted first adjacent carrier signal at a second cutoff frequency and frequency shifting said signal by a third frequency value;
frequency shifting a second adjacent carrier signal by a second frequency value plus a predetermined offsetting value, low-pass filtering the frequency shifted second adjacent carrier signal at a second cutoff frequency and frequency shifting said signal by a third frequency value; and
frequency shifting a third adjacent carrier signal by a second frequency value plus a second predetermined offsetting value, low-pass filtering the frequency shifted third adjacent carrier signal at a second cutoff frequency and frequency shifting said signal by a third frequency value.

11. The apparatus according to claim 8, wherein the apparatus comprises a first 3 decibel filter adapted to a first cutoff frequency of one of 130 kHz and 230 kHz and one or more second 3 decibel filters adapted to a second cutoff frequency of 30 kHz.

12. The apparatus according to claim 8, arranged such that the performing parallel baseband processing based upon the adjacent carrier power criterion comprises:

determining if the received signal strength of at least one adjacent carrier frequency is located proximately to a top ranked received signal strength carrier frequency, wherein at least one of each frequency carrier's location and carrier's number is stored in memory together with each measured power level in a top ranked received signal strength carrier list.

13. The apparatus according to claim 12, further arranged to:
determine if an adjacent frequency carrier is next to the top ranked received signal strength carrier frequency, and
in response to determining that a single adjacent frequency carrier is found next to the top ranked received signal strength carrier frequency, verifying that a signal strength difference fulfils a pre-specified criterion, wherein if the pre-specified criterion is fulfilled, executing two parallel baseband processing on the adjacent frequency carrier and a top ranked carrier frequency, and
in response to determining that no adjacent frequency carriers are identified among top ranked received signal strength carrier frequencies, feeding the top ranked carrier frequency into a single baseband processing branch.

14. The apparatus according to claim 12, further arranged to:
determine if two adjacent frequency carriers are next to the top ranked received signal strength carrier frequency, and
in response to determining that two adjacent frequency carriers are not next to the top ranked received signal strength carrier frequency, executing two parallel baseband processing on two neighboring frequency carriers, and
in response to determining that two adjacent frequency carriers are next to the top ranked received signal strength carrier frequency, verifying that signal strength difference between the two adjacent frequency carriers and the top ranked received signal strength carrier frequency fulfill a pre-specified criterion, and if the pre-specified criterion is fulfilled, setting up at least one of a plurality of parallel baseband processing branches according to the location of a strongest identified adjacent frequency carrier and according to a number and location of located frequency carriers fulfilling the pre-specified criterion, wherein three parallel baseband processing is executed if three frequencies carriers can be searched else two parallel baseband processing is executed.

15. The apparatus according to claim 14, wherein the plurality of parallel baseband processing branches are selected from the group consisting of:
a two baseband parallel search configured with one neighbouring frequency carrier located two carriers below a highest ranked frequency carrier;
a two baseband parallel search configured with one neighbouring frequency carrier located on the frequency carrier below the highest ranked frequency carrier;
a three baseband parallel search configured with two neighbouring frequency carriers located below the highest ranked frequency carriers;
a three baseband parallel search configured with one neighbouring frequency carrier located on each side of the highest ranked frequency carrier;

a three baseband parallel search configured with two neighbouring frequency carriers located above the highest ranked frequency carrier;

a two baseband parallel search configured with one neighbouring frequency carrier located on a frequency carrier above the highest ranked frequency carrier; or a two baseband parallel search configured with one neighbouring frequency carrier located two frequency carriers above the highest ranked frequency carrier.

16. The apparatus according to claim 13, wherein the pre-specified criterion is a decibel threshold value which is a positive value.

17. The apparatus according to claim 13, wherein if the frequency correction burst is not detected in a first adjacent carrier frequency, second adjacent carrier frequency and third adjacent carrier frequency, each carrier frequency's location and/or carrier's number are removed from the top ranked received signal strength carrier list and a next two or more top ranked adjacent carrier frequencies are selected and the frequency correction burst search is performed on those top ranked adjacent carrier frequencies.

18. The apparatus according to claim 17, arranged such that the three baseband or two baseband parallel search continues until a received signal strength indicator table is empty.

19. The apparatus according to claim 8, wherein the apparatus is a smart phone, a cellular phone, a personal digital assistant, a wireless modem, a wireless communication device, a laptop, a netbook, a tablet or any other device cable of communicating with a Long Term Evolution, Long Term Evolution Advanced, Long Term Evolution Beyond, FirstNet, public safety Long Term Evolution, Global Systems for Mobile Communication network, Enhanced Data Rates for Global Systems for Mobile Communication Evolution network, Universal Terrestrial Radio Access Network or Evolved Universal Terrestrial Radio Access Network.

20. A non-transitory computer-readable memory storing a computer program comprising a set of computer instructions executable by a machine for causing performance of operations, the operations comprising:

frequency shifting a received signal by a first frequency value and low-pass filtering the frequency shifted received signal at a first cutoff frequency to filter out a plurality of adjacent carrier frequencies; and performing parallel baseband processing on two or more adjacent carrier frequencies among the plurality of adjacent carrier frequencies based upon an adjacent carrier power criterion, said parallel baseband processing being adapted for detecting a frequency correction burst in two or more adjacent carrier frequencies.

* * * * *